United States Patent
Hasegawa et al.

(10) Patent No.: US 9,224,043 B2
(45) Date of Patent: Dec. 29, 2015

(54) MAP GENERATION APPARATUS, MAP GENERATION METHOD, MOVING METHOD FOR MOVING BODY, AND ROBOT APPARATUS

(75) Inventors: Osamu Hasegawa, Yokohama (JP); Hiroshi Morioka, Yokohama (JP); Noppharit Tongprasit, Yokohama (JP); Sangkyu Yi, Yokohama (JP)

(73) Assignee: Tokyo Institute of Technology, Tokyo (JP)

( * ) Notice: Subject to any disclaimer, the term of this patent is extended or adjusted under 35 U.S.C. 154(b) by 346 days.

(21) Appl. No.: 13/824,855

(22) PCT Filed: Aug. 30, 2011

(86) PCT No.: PCT/JP2011/004840
§ 371 (c)(1),
(2), (4) Date: May 6, 2013

(87) PCT Pub. No.: WO2012/035707
PCT Pub. Date: Mar. 22, 2012

(65) Prior Publication Data
US 2013/0216098 A1 Aug. 22, 2013

(30) Foreign Application Priority Data

Sep. 17, 2010 (JP) ................................. 2010-209657

(51) Int. Cl.
*G06K 9/00* (2006.01)
*G05D 1/02* (2006.01)
*G06T 7/00* (2006.01)
*G06T 7/20* (2006.01)

(52) U.S. Cl.
CPC .......... *G06K 9/00664* (2013.01); *G05D 1/0274* (2013.01); *G06T 7/0071* (2013.01);
(Continued)

(58) Field of Classification Search
None
See application file for complete search history.

(56) References Cited

U.S. PATENT DOCUMENTS 8,014,801 B2 * 9/2011 Lewis ............... H04M 3/42042
370/349
8,014,901 B2 * 9/2011 Matsushima et al. ......... 700/264
(Continued)

FOREIGN PATENT DOCUMENTS

| JP | 1-183708 A | 7/1989 |
| JP | 2007-038312 A | 2/2007 |
| JP | 2010-009370 A | 1/2010 |
| JP | 2010-033447 A | 2/2010 |

OTHER PUBLICATIONS

JP 2010-0033447, tazaki et al, Jul. 30, 2008 computer translation.*
(Continued)

*Primary Examiner* — Nancy Bitar
(74) *Attorney, Agent, or Firm* — Maier & Maier, PLLC

(57) ABSTRACT

Performing map construction under a crowded environment where there are a lot of people. It includes a successive image acquisition unit that obtains images that are taken while a robot is moving, a local feature quantity extraction unit that extracts a quantity at each feature point from the images, a feature quantity matching unit that performs matching among the quantities in the input images, where quantities are extracted by the extraction unit, an invariant feature quantity calculation unit that calculates an average of the matched quantities among a predetermined number of images by the matching unit as an invariant feature quantity, a distance information acquisition unit that calculates distance information corresponding to each invariant feature quantity based on a position of the robot at times when the images are obtained, and a map generation unit that generates a local metrical map as a hybrid map.

15 Claims, 15 Drawing Sheets

(52) U.S. Cl.
CPC ..... *G06T 7/2033* (2013.01); *G06T 2207/10016* (2013.01); *G06T 2207/20076* (2013.01); *G06T 2207/30241* (2013.01); *G06T 2207/30244* (2013.01); *Y10S 901/01* (2013.01)

(56) References Cited

U.S. PATENT DOCUMENTS

| | | | |
|---|---|---|---|
| 8,919,658 B2* | 12/2014 | Diamond | 235/492 |
| 2009/0281733 A1* | 11/2009 | Yamamoto | H04N 5/2254 702/19 |
| 2011/0077776 A1* | 3/2011 | Matsushima et al. | 700/264 |

OTHER PUBLICATIONS

International Search Report dated Oct. 18, 2011, as issued in corresponding International Patent Application No. PCT/JP2011/004840, filed Aug. 30, 2011 (2-pages).

Charles Bibby, et al., "Simultaneous Localisation and Mapping in Dynamic Environments (SLAMIDE) with Reversible Data Association", Proc. of Robotics: Science and Systems (RSS), 8 pages, 2007.

Wolfram Burgard, et al., "Experiences with an interactive museum tour-guide robot", Artificial Intelligence, vol. 114(1-2), pp. 3-55, 1999.

Chieh-Chih Wang, et al., "Simultaneous Localization, Mapping and Moving Object Tracking", The International Journal of Robotics Research (IJRR), vol. 26, pp. 889-916, 2007.

Denis Wolf, et al., "Online Simultaneous Localization and Mapping in Dynamic Environments", Proceedings of Intl. Conf. on Robotics and Automation ICRA, New Orleans, Louisiana, 7 pages, Apr. 2004.

Fabio T. Ramos, et al., "Recognising and Modelling Landmarks to Close Loops in Outdoor SLAM", Proc of ICRA, 6 pages, 2007.

Peter Biber, et al., "Dynamic Maps for Long-Term Operation of Mobile Service Robots", Proc. of Robotics: Science and Systems (RSS), 8 pages, 2007.

* cited by examiner

MAP GENERATION APPARATUS, MAP GENERATION METHOD, MOVING METHOD FOR MOVING BODY, AND ROBOT APPARATUS

RELATED APPLICATIONS

This is the U.S. national stage application which claims priority under 35 U.S.C. §371 to International Patent Application No. PCT/JP2011/004840 filed on Aug. 30, 2011, which claims priority to Japanese Patent Application No. 2010-209657 filed on Sep. 17, 2010, the disclosures of which are incorporated by reference herein their entireties.

TECHNICAL FIELD

The present invention relates to a map generation apparatus and a map generation method in which feature quantities are extracted from a plurality of a series of successive images and a map is created based on the feature quantities, a moving method for a moving body that moves based on this map, and a robot apparatus equipped with this map generation apparatus.

BACKGROUND ART

As a result of the recent development in the robot industry, the introduction of autonomous moving robots such as guard robots and nursing-care robot has been expected. In general, a moving robot requires a map in which position information of obstacles and the like are indicated in order to perform autonomous navigation. A problem for a moving robot to autonomously perform map construction/self-localization in an unknown environment is called "SLAM (Simultaneously Localization And Mapping)", and has been widely studied in the past.

CITATION LIST

Non Patent Literature

Non-patent literature 1: C. Bibby, I. Reid: "Simultaneous localisation and mapping in dynamic environments (SLAMIDE) with reversible data association", Proc. of Robotics: Science and Systems (RSS), 2007

Non-patent literature 2: W. Burgard, et al.: "Experiences with an interactive museum tour-guide robot", Arti_cial Intelligence, 114 (1-2), 3-55, 1999

Non-patent literature 3: C. C. Wang: "Simultaneous Localization, Mapping and Moving Object Tracking", The International Journal of Robotics Research (IJRR), 2007

Non-patent literature 4: D. Wolf, G. S. Sukhatme: "Online Simultaneous Localization and Mapping in Dynamic Environments", Proc. of ICRA, 2004

Non-patent literature 5: F. T. Ramos, et al.: "Recognising and Modelling Landmarks to Close Loops in Outdoor SLAM", Proc. Of ICRA, 2007

Non-patent literature 6: P. Biber, T. Duckett: "Dynamic Maps for Long Term Operation of Mobile Service Robots", Proc. of Robotics: Science and Systems (RSS), 2005

SUMMARY OF INVENTION

Technical Problem

However, in conventional systems, there is a problem that stable map construction/self-localization cannot be performed under an environment in which a lot of people are present in disorder such as a station yard and a shopping mall.

In an ordinary SLAM technique, assuming that the environment is static, the processing is performed. Therefore, when the technique like this is used under a crowded environment, a moving object like a human could be incorrectly recognized as a landmark and a mistake thereby occurs in map construction/self-localization, thus causing a problem that the algorithm breaks down. To cope with the problem like this, there are generally two kinds of possible methods. The first method is a method in which a moving object is handled explicitly, and the second method is a method in which processing is performed by removing a moving object as an outlier.

As an example of the method in which a moving object is handled explicitly, Non-patent literature 1 proposes a technique which makes it possible to redo data mapping for observation points in the past by using the least squares method and the EM algorithm and in which dynamic objects and static objects are handled in the same framework.

Further, as an example of the method in which a moving object is removed as an outlier, Non-patent literature 2 proposes a tour robot that separates known objects from moving objects such as a human by using an entropy filter and thereby performs self-localization under an environment in which there are a lot of people, e.g., in an art museum. However, this tour robot requires that an accurate map should be provided in advance.

Further, in Non-patent literatures 3 and 4, the accuracy is improved by tracking a moving object and removing it from the SLAM process. However, in these studies, there are still unsolved problems such as a method for separating moving objects from stationary objects.

Further, Non-patent literature 5 adopts a technique in which stationary objects such as trees are learned from image data in advance and they are used as landmarks for the SLAM so that errors that are caused by objects other than the pre-learned landmarks, such as people and cars, are prevented. However, since it is necessary to learn landmarks from images in advance, it is necessary to learn new landmarks again when the robot is adapted to a different environment.

Non-patent literature 6 adopts a technique for gradually correcting a map by taking account of a tradeoff between new observation data and observation data obtained when visiting there in the past due to environmental changes over a long time, such as changes of obstacle positions. However, this technique does not give any consideration to robustness against environmental changes over a short time, such as a moving person.

The present invention has been made to solve these problems and an object thereof is to provide a robot apparatus that performs online-additional map construction/self-localization under a crowded environment in which there are a lot of people and autonomously moves according to a route taught by a human, a moving method for a moving body, and a map generation apparatus and a map generation method for generating a map used by this robot apparatus.

Solution to Problem

A map generation method according to the present invention includes: a successive image acquisition step of obtaining successive images that are successively taken while a moving body is moving;

a local feature quantity extraction step of extracting a local feature quantity at each feature point from the successive images obtained in the successive image acquisition step, a feature quantity matching step of perform matching among the local feature quantities in the successive input images, the local feature quantities being extracted in the local feature quantity extraction step, an invariant feature quantity calculation step of calculating an average of matched local feature quantities among a predetermined number of successive images in the feature quantity matching step as an invariant feature quantity, a distance information acquisition step of calculating distance information corresponding to each invariant feature quantity based on a position of the moving body at each point in time when the successive images are obtained, and a map generation step of generating a local metrical map as a hybrid map including the invariant feature quantity and the distance information.

In the present invention, it is possible to create a local metrical map, which is a hybrid map, by calculating an invariant feature quantity (PIRF), calculating distance information corresponding to each PIRF based on the position of the moving body at each point in time when the successive images are obtained, and incorporating the distance information into the PIRF. The creation of this hybrid map makes route planning easier. Further, since the hybrid map includes distance information, it makes possible to perform sophisticated route planning such as a search for the shortest route.

Further, the map generation method further includes a position information acquisition step of obtaining a position and a posture of the moving body, and a position of a feature point corresponding to the invariant feature quantity from information and an observation values. The information is about a movement of the moving body at each point in time when a series of a plurality of successive images are obtained, the observation value indicating a measurement direction of a feature point having the invariant feature quantity. The measurement direction is seen from the moving body. In the map generation step, the hybrid map including a position and a posture of the moving body, and a position and an invariant feature quantity of a feature point are generated. It is possible to obtain a position and a posture of a moving body, and a position of a feature point from information about a movement and an observation value, and thereby to generate a hybrid map having higher practicality.

Further, in the position information acquisition step, a stochastically most likely position and posture of the moving body and a position of the feature point are calculated from a group of information and a group of the observation values. The group of the information is about the moving body at each point in time when the plurality of successive images from which the invariant feature quantity are obtained. Therefore, a position and a posture of the moving body and a position of a feature point can be calculated with higher accuracy.

Furthermore, in the position information acquisition step, the hybrid map including a position and a posture of the moving body at each point in time and a position of the feature point are generated. The position and the posture of the moving body and the position of the feature point are obtained among the plurality of successive images by minimizing a below-shown expression with an observation value $z_{ij}$ and an input $u_t$. The observation value $z_{ij}$ indicates in which direction the invariant feature quantity is seen from the moving body at each point in time. The input $u_t$ indicates distance information that is used when the moving body moves from $x_t$ to $x_{t-1}$, when the position and the posture of the moving body is represented by $x_t$. In order to obtain distance information for a PIRF, an SWF (Sliding Window Filter) can be used.

$$\hat{x}, \hat{m} \triangleq \underset{[x,m]}{\operatorname{argmax}} \left\{ \|\widetilde{x}_0 - x_0\|_{P_0}^2 + \|\widetilde{m} - m\|_{\Pi}^2 + \sum_{t-1}^{M} \|f(x_{t-1}, u_t) - x_t\|_{Q_t}^2 + \sum_{t-1}^{M} \sum_i \|h(x_t, m_i) - z_i\|_{R_i}^2 \right\} \quad \text{[Expression 1]}$$

where:
$\hat{x}$: position and posture of moving boyd;
$\hat{m}$: position of invariant feature quantity;
$Q_t$: covariance corresponding to behavior model of $x_t$ when input $u_t$ is added in posture $x_{t-1}$;
$R_t$: covariance corresponding to measurement model of measurement value $z_i$ when feature point mi is observed from position $x_t$ of moving body;
f: behavior model;
h: measurement model;
$\widetilde{x}_0$: average of $x_0$; and
$\hat{m}$: average of m.

Further, the invariant feature quantity and a position and a posture of the moving body are obtained from a plurality of successive images. The map generation step includes a past image delete step of deleting past successive images so that the number of successive images that are used to calculate the position and the posture of the moving body and the invariant feature quantity is equal at each point in time, and deleting the invariant feature quantity that disappears as a result of deleting the successive images. In this way, it is possible to maintain the calculation speed at a fixed speed at all times.

Further, the map generation method may further include a place determination step of determining whether or not a current place was visited in past, and a locus correction step of, when the current place was visited in past, correcting a previous position and posture $x_{Li0}$ of the moving body and a current position and posture $x_{Li}$ of the moving body based on $x_{Li0}$ and $x_{Li}$. In this way, it is possible to create a more accurate map.

Further, in the locus correction step, the values $x_{Li0}$ and $x_{Li}$ may be corrected by minimizing a below-shown expression.

$$\sum_{i=1}^{N_L} \|x_{Li} - x_{Li0}\|_{P_L}^2 + \sum_{i=1}^{T} \|x_{t-1} \oplus v_t - x_t\|_{Q_y}^2 \quad \text{[Expression 2]}$$

where: $P_L$ and $Q_y$ are covariance that is used when Mahalanob is distance is calculated; $x_{Li}$ is place that is detected as ith place visited in past; $x_{Li0}$ is place that is recognized as same place as $x_{Li}$; $N_L$ is number of times of detection that it is place visited in past; T is total number of steps until now; $v_t$ is relative coordinate of $x_t$ as observed from $x_{t-1}$; and $x_{t-1} \oplus v_t - x_t$ indicates arrival point when it moves by $v_t$ on relative coordinates of locus $x_{t-1}$ of moving body.

A map generation apparatus according to the present invention includes: successive image acquisition means for obtaining successive images that are successively taken while a moving body is moving, local feature quantity extraction means for extracting a local feature quantity at each feature point from the successive images obtained by the successive image acquisition means, feature quantity matching means for perform matching among the local feature quantities in the successive input images, the local feature quantities being extracted by the local feature quantity extraction means, invariant feature quantity calculation means for calculating an average of matched local feature quantities among a predetermined number of successive images by the feature quantity matching means as an invariant feature quantity, distance information acquisition means for calculating distance information corresponding to each invariant feature quantity based on a position of the moving body at each point in time when the successive images are obtained, and map generation means for generating a local metrical map as a hybrid map including the invariant feature quantity and the distance information.

A moving method for a moving body according to the present invention is a moving method for a moving body that performs route planning according to a local metrical map created in advance and thereby moves, including: a successive image acquisition step of obtaining successive images while a moving body is moving, a local feature quantity extraction step of extracting a local feature quantity at each feature point from the successive images obtained in the successive image acquisition step, a feature quantity matching step of perform matching among the local feature quantities in the successive input images, the local feature quantities being extracted in the local feature quantity extraction step, an invariant feature quantity calculation step of calculating an average of matched local feature quantities in a predetermined number of successive images in the feature quantity matching step as an invariant feature quantity, a distance information acquisition step of calculating distance information corresponding to each invariant feature quantity based on a position of the moving body at each point in time when the successive images are obtained, and a locus correction step of comparing the calculated invariant feature quantity and the distance information with an invariant feature quantity and distance information registered on the local metrical map, determining whether or not a current place is registered, and when the current place is registered, correcting the current place based on information of the local metrical map. The local metrical map is a hybrid map including distance information corresponding to each invariant feature quantity calculated based on position information at each point in time when the moving body has obtained the successive images and including the invariant feature quantity.

In the present invention, since navigation is implemented by using a hybrid map including the invariant feature quantity and the distance information, stable feature quantities are extracted even under a complicated environment such as a dining lounge. Therefore, it is possible to implement extremely accurate navigation.

Further, in the locus correction step, when a current place is registered on the local metrical map, a registered position and posture $x_{Learnedi0}$ of the moving body and a current position and posture $x_{Li}$ of the moving body may be corrected based on $x_{Learnedi0}$ and $x_{Li}$.

Further, in the locus correction step, the values $x_{Learnedi0}$ and $x_{Li}$ are corrected by minimizing a below-shown expression:

$$\sum_{i=1}^{N_L} \|x_{Li} - x_{Learnedi0}\|_{P_L}^2 + \sum_{i=1}^{T} \|x_{t-1} \oplus v_t - x_t\|_{Q_y}^2 \qquad \text{[Expression 3]}$$

where: $P_L$ and $Q_y$ are covariance that is used when Mahalanobis distance is calculated; $x_{Li}$ is place that is detected as ith place registered on map; $x_{Learnedi0}$ is place that is recognized as same place as $x_{Li}$; $N_L$ is number of times of detection that it is place registered on map; T is total number of steps until now; $v_t$ is relative coordinates of $x_t$ as observed from $x_{t-1}$; and $x_{t-1} \oplus v_t - x_t$ indicates arrival point when it moves by $v_t$ on relative coordinates of locus $x_{t-1}$ of moving body.

Further, the moving method for a moving body may further include a relative coordinate calculation step of calculating a relative coordinate indicating how much a current place is different from a place registered on a map. In the locus correction step, the locus may be corrected by using the relative coordinate as the value $x_{Li}$. It is possible to implement more accurate navigation by obtaining a relative coordinate between a current place and a registered place and performing Loop-Closing.

A robot apparatus according to the present invention is a robot apparatus that performs route planning according to a local metrical map created in advance and thereby moves, including: successive image acquisition means for obtaining successive images while a moving body is moving, local feature quantity extraction means for extracting a local feature quantity at each feature point from the successive images obtained by the successive image acquisition means, feature quantity matching means for perform matching among the local feature quantities in the successive input images, the local feature quantities being extracted by the local feature quantity extraction means, invariant feature quantity calculation means for calculating an average of matched local feature quantities among a predetermined number of successive images as an invariant feature quantity, distance information acquisition means for calculating distance information corresponding to each invariant feature quantity based on a position of the moving body at each point in time when the successive images are obtained, and locus correction means for comparing the calculated invariant feature quantity and the distance information with an invariant feature quantity and distance information registered on the local metrical map, determining whether or not a current place is registered, and when the current place is registered, correcting the current place based on information of the local metrical map. The local metrical map is a hybrid map including distance information corresponding to each invariant feature quantity calculated based on position information at each point in time when the moving body has obtained the successive images and including the invariant feature quantity.

Advantageous Effects of Invention

According to the present invention, it is possible to provide a robot apparatus that performs map construction under a crowded environment in which there are a lot of people and autonomously moves according to a route taught by a human, a moving method for a moving body, and a map generation apparatus and a map generation method for generating a map used by this robot apparatus.

DESCRIPTION OF EMBODIMENTS

Figure 1:
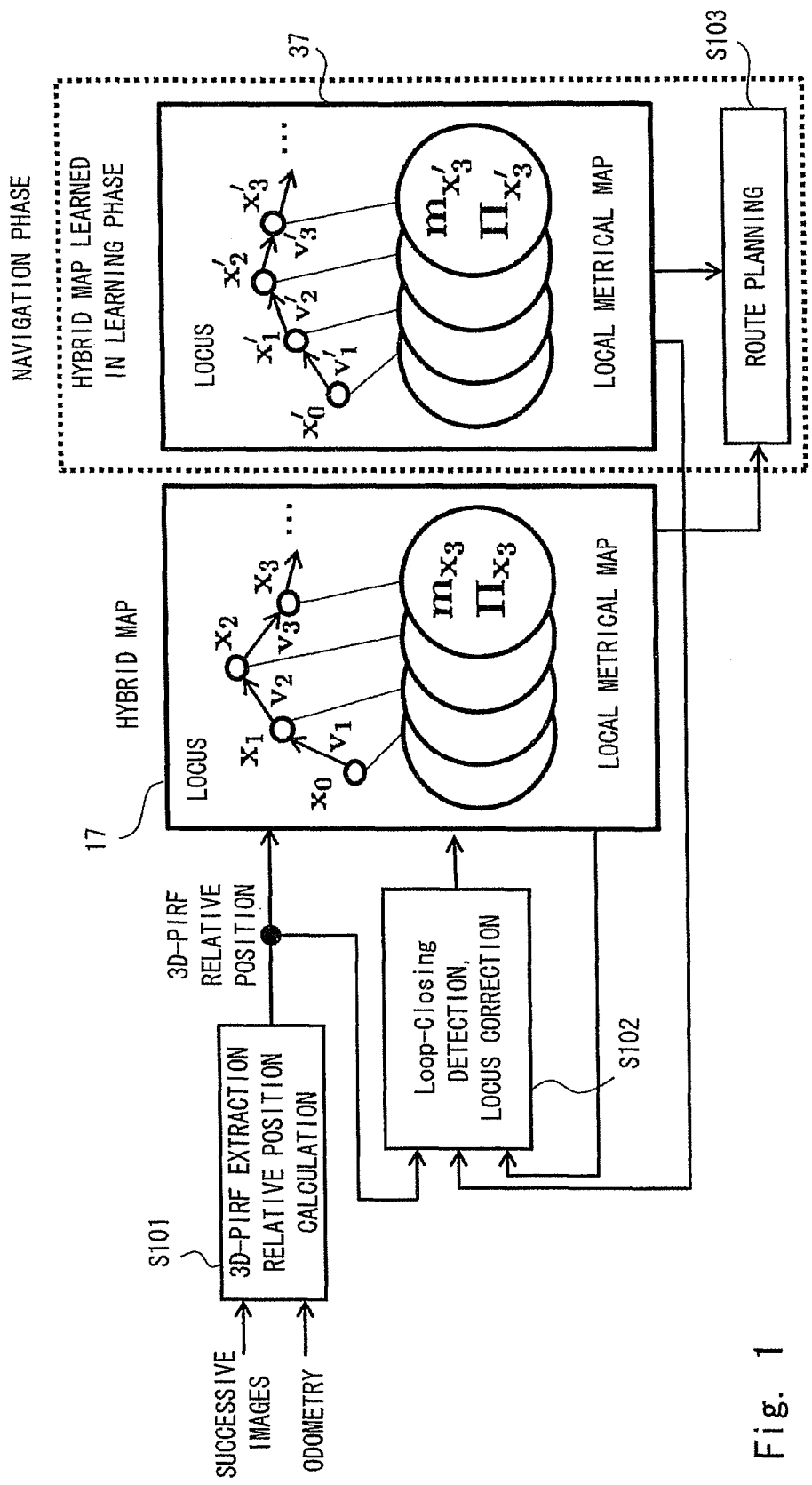
FIG. 1 shows a hybrid map according to a first exemplary embodiment of the present invention.

Specific exemplary embodiments according to the present invention are explained hereinafter with reference to the drawings. In these exemplary embodiments, the present invention is applied to a map generation apparatus that generates a hybrid map (local metrical map) using a local map, and a robot apparatus that navigates by using this local metrical map.

An object of the present invention is to perform online-additional map construction/self-localization under a crowded environment in which there are a lot of people and autonomously move according to a route taught by a human.

As a feature point that is often used in SLAM using an extracted image of a three-dimensional feature point that is stable even under a crowded environment, SIFT and Corner-point have been known. In general, mapping can be easily obtained for local feature points such as SIFT and Corner-point. Therefore, they are suitable for SLAM using images. However, there is a problem that when SIFTs are extracted from an image that is obtained by a robot under a crowded environment in which a lot of people are present in disorder, a lot of weak feature points that disappear when the robot moves slightly and feature points that are obtained from moving people are extracted. When there are a lot of such unstable feature points, the processing time increases wastefully. In addition, a problem that they have adverse effects on the map construction occurs.

To cope with this problem, the applicant of the present application has proposed a feature quantity called "PIRF (Position Invariant Robust Feature)" in Japanese Patent Applications No. 2009-200764, No. 2010-081027 and No. 2010-115307. As described later, the PIRF is a technique in which: SIFTs are extracted from a plurality of successive images; matching is obtained in succession; and only matched feature points in all the images are extracted.

The PIRF can extract a part that has a small visual change with respect to the movement of the robot as a feature, and as a result, can remove a feature point(s) of a part that is extracted from a moving person or the like and thereby has a large visual change.

Incidentally, the SLAM generally includes a metrical technique in which a map is expressed by successive spatial arrangements, a topological technique in which in which a map is expressed by discrete graph structures, and a hybrid technique which combines both of them. In the hybrid technique, a map in which each node has information similar to information of a local metrical map is constructed. Meanwhile, since the hybrid technique has a graph structure, route planning can be easily performed and distance information can be also used. Therefore, the hybrid technique has such a characteristic that more sophisticated route planning such as a search for the shortest route can be performed.

Accordingly, the inventors of the present applicant has diligently experimented and studied, and has found a method for constructing a hybrid map using the above-described PIRF by taking out feature points from a plurality of image data using the PIRF and thereby extracting stable feature points even under a crowded environment in which there are a lot of people, and then mapping them on a three-dimensional space.

The PIRF is originally a feature point on an image that is extracted from the image, and cannot be directly applied to the SLAM. Further, the PIRF is a feature quantity that is not extracted from a single image, but is extracted from a plurality of a series of successive images. Therefore, distance information cannot be connected to this feature quantity in a simple manner. Accordingly, the inventors of the present applicant has diligently experimented and studied, and has found a technique for mapping PIRFs on a three-dimensional space (3D-PIRF) by combining odometry information into SIFTs of successive images.

First Exemplary Embodiment of the Present Invention

FIG. 1 shows a hybrid map according to this exemplary embodiment. The locus of a robot is indicated in a graph by nodes $x_t$ and edges $v_t$. Further, each node has information of a position $m_x$ and a variance $\Pi_x$ of a 3D-PIRF, and each edge has information of a relative position v between nodes. Note that $v_t$ can be calculated as relative coordinates of $x_t$ observed from $x_{t-1}$.

Figure 2:
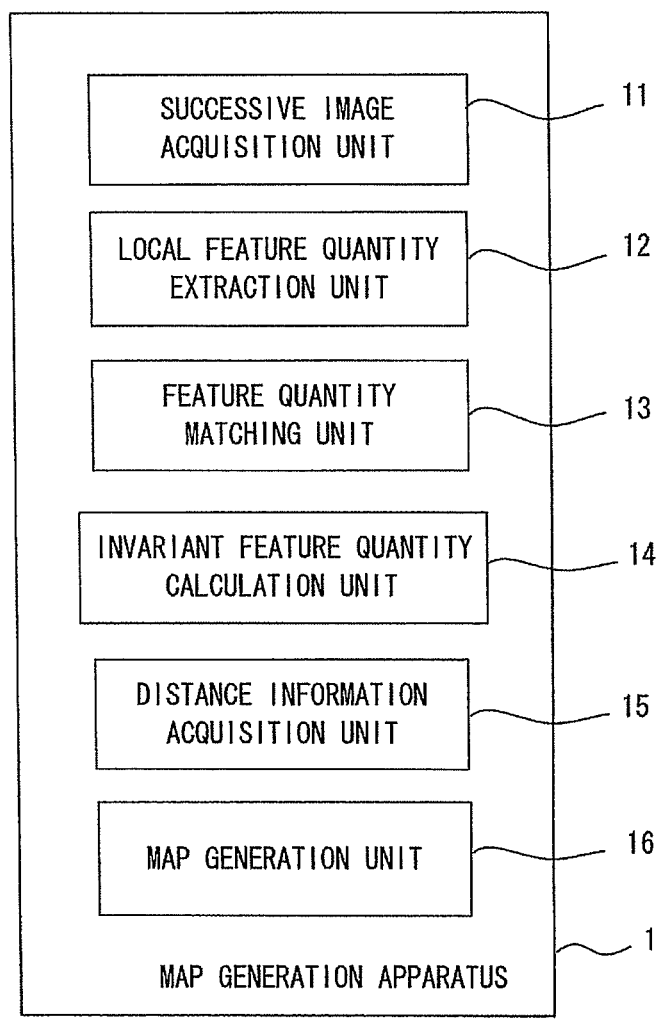
FIG. 2 shows a map generation apparatus according to a first exemplary embodiment of the present invention.

Firstly, a map generation apparatus according to this exemplary embodiment is explained. FIG. 2 shows a map generation apparatus according to this exemplary embodiment. As shown in FIG. 2, a map generation apparatus 1 according to this exemplary embodiment includes a successive image acquisition unit 11, a local feature quantity extraction unit 12, a feature quantity matching unit 13, an invariant feature quantity calculation unit 14, a distance information acquisition unit 15, and a map generation unit 16.

The successive image acquisition unit 11 obtains successive images that are successively taken while a moving body such as a robot is moving. The local feature quantity extraction unit 12 extracts a local feature quantity at each feature point from the successive images obtained by the successive image acquisition unit 11. The feature quantity matching unit 13 obtains matching among local feature quantities in successive input images, and the local feature quantities are extracted by the local feature quantity extraction unit 12. The invariant feature quantity calculation unit 14 calculates the average of matched local feature quantities among a predetermined number of successive images by the feature quantity matching unit 13 as an invariant feature quantity. The distance information acquisition unit 15 calculates distance information corresponding to each invariant feature quantity based on a position (coordinates or the like) of the robot at each point in time when the successive images are obtained. The map generation unit 16 generates a local metrical map as a hybrid map including this invariant feature quantity and the distance information.

Note that the distance information acquisition unit 15 or the map generation unit 16 includes a position information acquisition unit (not shown) that obtains the position and the posture of a robot and the position of a feature point corresponding to an invariant feature quantity (PIRF) based on information about the movement of the robot at each point in time when a series of a plurality of successive images are obtained and an observation value indicating the measurement direction of the feature point having the PIRF from the robot. In this way, the map generation unit 16 can generate a hybrid map including the position and the posture of the robot, and the position of a feature point and its PIRF.

Further, the position information acquisition unit calculates the stochastically most likely position and posture of the robot and the position of a feature point based on a series of information pieces about the robot at each point in time when a plurality of successive images for which the PIRF is obtained are obtained and a series of observation values. Details of the way of obtaining the position and posture of the robot and the position of a feature point are described later.

The map generation apparatus 1 according to this exemplary embodiment is explained hereinafter in detail. Firstly, a calculation method of a PIRF, which is an invariant feature quantity, is explained. As described previously, the applicant of the present application has already disclosed a calculation method of a PIRF in Japanese Patent Applications No. 2009-200764, No. 2010-081027 and No. 2010-115307.

The PIRF has been contrived as a feature quantity that is hardly incorrectly-recognized even in a crowded environment based on the fact that a visual difference due to a change in a shooting position or a shooting time (feature quantity change) is large for a nearby object, whereas a visual difference is small for a distant object (feature quantity of landmark does not change widely).

To put it simply, it is a technique in which: matching of local features is performed among successive images; matched features successively obtained among a predetermined number of images are selected; and in the selected feature, the average of all the features that are matched with that feature is extracted/described as a feature quantity PIRF.

Firstly, the successive image acquisition unit 11 obtains successive images. Since the PIRF is a feature quantity extracted from a plurality of successive images, successive images, i.e., video images are necessary as the input. For example, omnidirectional images can be used. The successive images that are required for the PIRF are a certain set of images, and are video images that are successively taken at every second at a fixed frame rate, for example, two frames per second. That is, images that are captured from a video camera are usually successive images, and successive images in the PIRF have to be ones using video images. The acquisition rate of images is set according to the speed of the camera. For example, when a camera is mounted on a car, the speed of the camera is about 1000 m/minute. Further, the successive images captured from the video camera are around 50 to 100 frame/second.

Figure 3:
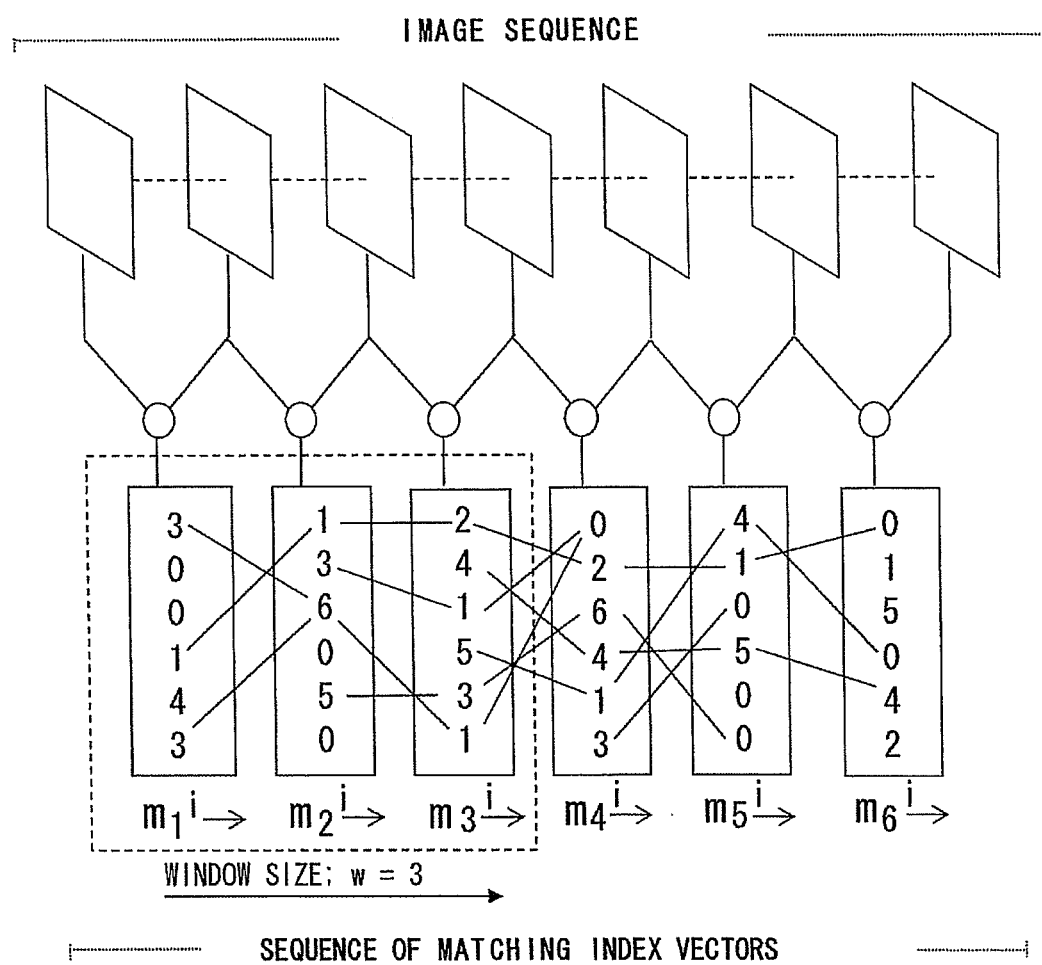
FIG. 3 is a diagram for explaining a method for extracting a feature quantity PIRF according to a first exemplary embodiment of the present invention.

FIG. 3 is a diagram for explaining a method for extracting a feature quantity PIRF according to this exemplary embodiment. The local feature quantity extraction unit 12 extracts local feature quantities by using an existing local feature quantity extraction method. For example, the local feature quantity extraction unit 12 can use feature quantities of SIFT (Scale Invariant Feature Transformation) or SURF (Speed Up Robustness Features). Alternatively, needless to say, local feature quantities other than the SIFT and the SURF can be also used. In particular, it is preferable to use scales, rotational variations, or other local feature quantities that are robust against noises and the like. By using these local feature quantities, properties of existing feature quantities can be taken over as they are. Therefore, it becomes possible to extract/describe them as features that are robust against changes in the illumination and the like. Note that the number of omnidirectional images in an ith area is represented by $n_i$ and a set of local feature quantities extracted from a jth image among them is represented by $U_j^i$. Further, a local feature quantity is represented by $\vec{u}$.

Next, the feature quantity matching unit 13 performs matching among each of the feature quantities constituting the local feature quantity $\vec{u}$ between every two successive images. That is, matching between all the local feature quantities on a (j=q)th image and all the local feature quantities on a (j=q+1)th image is performed. Note that an index to each matched feature is calculated as a matching result vector $\vec{m_q^i}$.

An example of a matching method is explained hereinafter by using SIFT as an example. A feature extracted from an image $I_a$ is represented by v. It is determined whether or not this feature v matches a feature v' on the next image $I_{a+1}$. Firstly, the dot products between the feature v and all the features extracted from the image $I_{a+1}$ are obtained. Then, the results are sorted in order to obtain the most resembling feature $v_{first}$ and the next resembling feature $v_{second}$. If the relation $(v_{first} \cdot v)/(v_{second} \cdot v) > \theta$ is satisfied, it is determined that (matched feature v')=$v_{first}$. Note that the threshold $\theta$ can be, for example, 0.6. When the above-described relation is not satisfied, it is determined that there is no feature on the image $I_{a+1}$ that matches the feature v on the image $I_a$.

As shown in FIG. 3, a case where six local feature quantities are extracted from each input image is explained. Matching is performed among these six local feature quantities. Then, only when matched one among the local feature quantities is obtained, an index is assigned to the matched feature quantity. For example, it is shown that the first local feature quantity of $\vec{m_1^i}$ matches the third local feature quantity of $\vec{m_2^i}$, and that the third local feature quantity of $\vec{m_2^i}$ matches the sixth local feature quantity of $\vec{m_3^i}$.

Next, a successive feature quantity select unit (not shown) selects successive feature quantities. Firstly, it is determined how many $\vec{m_q^i}$ are used to obtain successive feature quantities. This number of $\vec{m_q^i}$ is also called "window size w" in this specification. Further, a set of $\vec{m_q^i}$ included in this window size w is called "sub-place". Note that as the window size w becomes larger, it is possible to extract only successive feature quantities that are more robust and have a higher discriminating ability. However, if the window size w is too large, the number of features becomes extremely smaller. Further, if it is too small, feature quantities that are not robust and have a poor discriminating ability are also extracted. Therefore, it is necessary to optimize the window size w according to the purpose or the like.

In this exemplary embodiment, the window size w is set to three. Therefore, successive feature quantities are obtained by using four successive input images. That is, as shown in FIG. 3, the first sub-place includes $\vec{m_1^i}$, $\vec{m_2^i}$ and $\vec{m_3^i}$ and input images $I_1$, $I_2$, $I_3$ and $I_4$ correspond to them. Note that when the number of indexes is zero, it means that there is no feature quantity to be matched next. Therefore, in the case of FIG. 2, the first sub-place includes three successive feature quantities.

After the window size w is set, the successive feature quantity select unit 23 shifts this window w one by one and thereby extracts features that appear in common in all of the four omnidirectional images included in that window size as successive feature quantities. After the window size w is set, a function that is used to extract successive feature quantities is defined as shown below. Note that b is an index vector number of interest.

[Expression 4]

$$f(m_{a,b}^i) = \begin{cases} 1, & \text{if } b = e, m_{(m_{a,b}^i),b+1}^i > 0 \\ f(m_{(m_{a,b}^i),b+1}^i), & \text{if } b \neq e, m_{(m_{a,b}^i),b+1}^i > 0 \\ 0, & \text{Otherwise} \end{cases}$$

$$e = b + w - 2$$

Further, $f(m_{x,y}^i)$ is calculated for all the matching result vectors $m_q^i \rightarrow$. Then, only the local feature quantities $u_{x,y}^i \rightarrow$ at the time when $f(m_{x,y}^i) > 0$ is satisfied are extracted. When the number of input images is $n_t$ and the window size is w, the number of sub-places is expressed as $n_t - w + 1$. Note that the window size may be changeable, and may be changed as appropriate according to the surrounding circumstance or the like.

The invariant feature quantity calculation unit 14 calculates the average of matched local feature quantities within the sub-place that is the same window group. A PIRF dictionary is constructed by vectors composed of these average values. Then, $(n_t - w + 1)$ sub-place PIRF dictionaries ($D_j^i$, $j \leq n_t - w + 1$) extracted from all of the $(n_t - w + 1)$ sub-places are registered in a PIRF dictionary ($D^i$). The average of matched local feature quantities which constitute this PIRF dictionary is the PIRF.

Since the PIRF that is extracted in the above-described manner is extracted as the matched feature point between all the neighboring images among the SIFT feature points extracted from each image, it is possible to remove the feature points of parts that have a large visual change.

Next, a method for generating a local metrical map by using this PIRF is explained. Referring to FIG. 1 again, firstly, 3D-PIRF is calculated from successive images and odometry (S101). Note that it is necessary to calculate three-dimensional positions of feature points in order to extract the 3D-PIRF. However, since the 3D-PIRF uses observation data in the past several steps, it is impossible to combine it with a technique in which only the current state of a moving body such as a robot is held, such as a Kalman filter.

Therefore, in this exemplary embodiment, SWF (Sliding Window Filter) is used. The SWF has such a characteristic that the calculation time can be maintained at a fixed length by deleting postures/feature points that are older than a certain period. By using this, it is possible to calculate a three-dimensional position of a 3D-PIRF and thereby to extract a 3D-PIRF from successive images and odometry information. This 3D-PIRF is extracted as a feature point in a three-dimensional space from successive images obtained in a plurality of steps and odometry information between each step. Note that although the SWF technique is used as means for connecting a PIRF with position information in this exemplary embodiment, other methods may be also used, provided that a hybrid map using PIRFs can be created.

Figure 4:
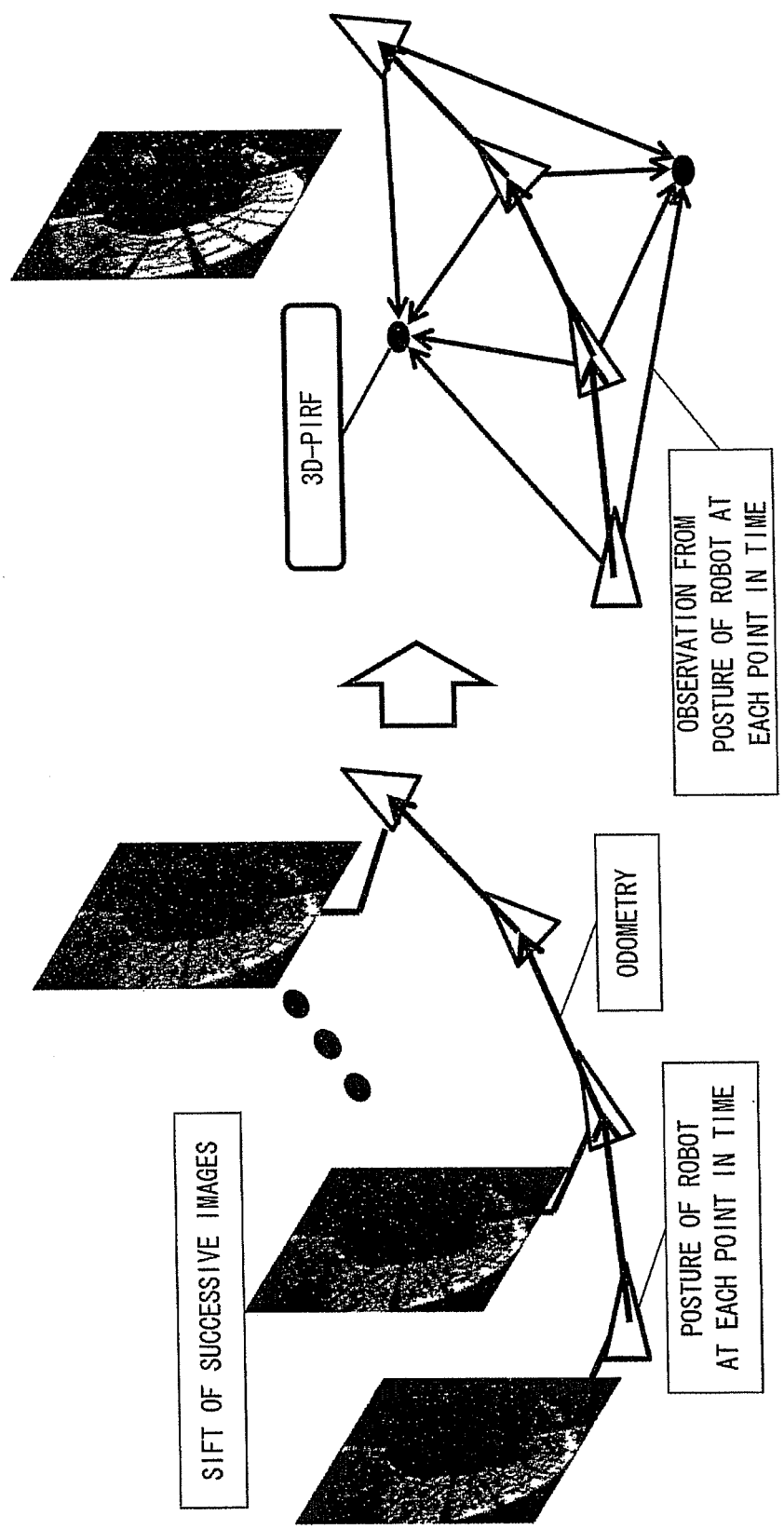
FIG. 4 shows a concept of PIRF and 3D-PIRF in a first exemplary embodiment of the present invention.

FIG. 4 shows a concept of a PIRF and a 3D-PIRF. A PIRF is calculated from a SIFT of successive images at each point in time. Further, a 3D-PIRF is calculated from the position (coordinates) and the posture (angle) of a moving body such as a robot at each point in time, odometry, and observation values of the feature points observed from moving body at each point in time (angle of feature point with respect to moving body).

Figure 5:
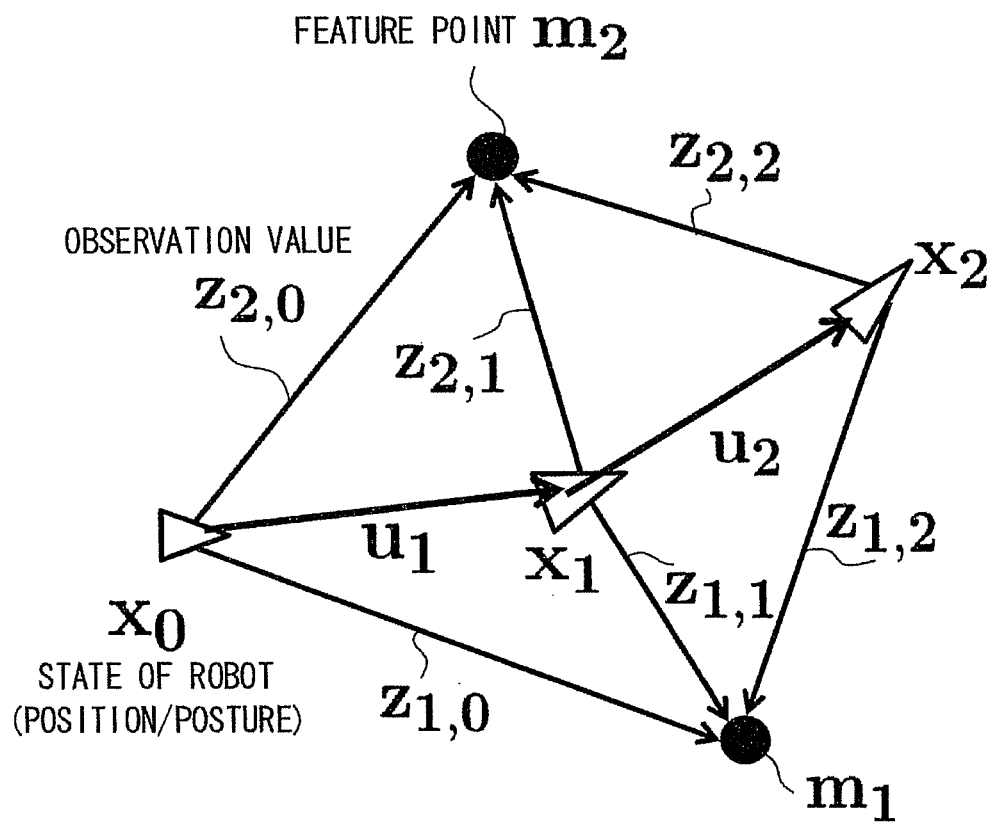
FIG. 5 shows SWF in a first exemplary embodiment of the present invention, and is a diagram for explaining a calculation method of 3D-PIRF.

FIG. 5 shows an SWF, and is a diagram for explaining a calculation method of a 3D-PIRF. The vector $x = [x_0^T, \ldots, x_M^T]^T$ represents the position and the posture of the moving body (robot) at each point in time. The vector $z_{ij}$ represents an observation value of a feature point i observed from a posture j of the robot. The observation value indicates the measurement direction of the feature point from the robot, and is expressed as the angle of the feature point with respect to the robot. Further, $u_i$ indicates an input that is used when the robot moves from a given position and posture $x_{i-1}$ to the next position and posture (position and posture at next point in time) $x_i$. This input indicates, for example, a speed and the number of revolutions provided to a wheel(s) in the case of a wheel-type robot, and the distance can be calculated based on these values.

The SWF maximizes a posterior probability $p(x, m|u, z)$ from an input series $u = [u1, \ldots, um-1]T$ and an observation value $z = [z11, \ldots, znm]T$.

[Expression 5]

It is a technique for obtaining a position/posture $\hat{x}$ of a robot and a position $\hat{m}$ of each feature point.

Note that in the following explanation, $\hat{x}$ is also represented by x^ and $\hat{m}$ is also represented by m^.

Firstly, the joint probability of x, m, u and z is expressed as shown below.

[Expression 6]

$$p(x, m, u, z) \propto p(x_0)p(m) \times \prod_{t=1}^{M} p(x_t | x_{t-1}, u_t) \prod_i p(z_i | x_t, m_i) \quad (1)$$

where: $p(x_0)$ is prior distribution for position and posture of robot; $p(m)$ is prior distribution for map; $p(x_t|x_{t-1}, u_t)$ is behavior model when input $u_t$ is added in posture $x_{t-1}$; and $p(z_i|x_t, m_i)$ is measurement model of observation value $z_i$ when feature point mi is observed from position $x_t$ of robot.

They are assumed to be Gaussian distributions respectively shown below.

[Expression 7]

$$p(x_0) \propto \exp\left(-\frac{1}{2}\|\tilde{x}_0 - x_0\|_{Q_0}^2\right) \quad (2)$$

[Expression 8]

$$p(m) \propto \exp\left(-\frac{1}{2}\|\tilde{m} - m\|_{\Pi}^2\right) \quad (3)$$

[Expression 9]

$$p(x_t | x_{t-1}, u_t) \propto \exp\left(-\frac{1}{2}\|f(x_{t-1}, u) - x_t\|_{Q_t}^2\right) \quad (4)$$

[Expression 10]

$$p(z_i | x_t, m_i) \propto \exp\left(-\frac{1}{2}\|h(x_t, m_i) - z_i\|_{R_t}^2\right) \quad (5)$$

where: each of $Q_0$, $\Pi$, $Q_t$ and $R_t$ is corresponding covariance; $\tilde{x}_0$ is average of $x_0$; $\tilde{m}$ is average of m; f is behavior model; and h is observation model.

Under the above-shown setting, x^ and m^, which are the maximum posterior probabilities, are obtained by minimizing the below-shown Expression (8).

[Expression 11]

$$\hat{x}, \hat{m} \stackrel{\Delta}{=} \underset{[x,m]}{\operatorname{argmax}} p(x, m \mid u, z) \quad (6)$$

$$= \underset{[x,m]}{\operatorname{argmin}}(-\log(p(x, m, u, z))) \quad (7,8)$$

$$= \underset{[x,m]}{\operatorname{argmax}}\left\{\|\tilde{x}_0 - x_0\|^2_{P_0} + \|\tilde{m} - m\|^2_{\Pi} + \sum_{t=1}^{M}\|f(x_{t-1}, u_t) - x_t\|^2_{Q_t} + \sum_{t=1}^{M}\sum_{i}\|h(x_t, m_i) - z_i\|^2_{R_i}\right\}$$

By optimizing this Expression (8), x^ and m^ and their corresponding covariance (covariance matrix Π^) are obtained.

Next, by using these values, a hybrid map 17 in which the state of the robot and a relative position relation (local map) of each feature point are registered is constructed.

Firstly, a position m^ of a feature point and its covariance matrix Π^ are stored as a local map. By storing a position m^ of a feature point and its covariance matrix Π^ in each step, a node (local map) of the hybrid map can be constructed.

Further, a relative position between nodes, which is information possessed by an edge of the hybrid map, is obtained. For this relative position, firstly, the position/posture x^ of the robot can be obtained by minimizing Expression (8) as described above. By doing so, the position and posture $x_t$ of the robot at each point in time is obtained. As a result, the below-shown Expression (9) is obtained.

[Expression 12]

$$x_t \ominus x_{t-1} \quad (9)$$

By this expression, relative coordinates $v_t$ of $x_t$ observed from $x_{t-1}$ can be obtained. Expression (9) indicates relative coordinates of $x_t$ observed from $x_{t-1}$. The relative coordinates $v_t$ are stored as edge information. Through the above-described processes, a hybrid map can be constructed.

Next, in this exemplary embodiment, successive images in the past are deleted so that the number of successive images that are used to calculate the position and posture of the robot and the PIRF is equal at each point in time. Further, PIRFs that disappear because those successive images are deleted are also deleted.

Note that although the position and posture of the robot and the PIRF are calculated from a plurality of successive images, the number of the plurality of successive images may be variable. For example, the number of successive images can be increased in a place where the number of feature points is particularly large, whereas the number of successive images can be reduced in a place where the number of feature points is small.

Note that when the position and posture of the robot and the PIRF are calculated at a given point in time and then the position and posture of the robot and the PIRF are calculated at the next point in time, the oldest successive images can be discarded. By doing so, it is possible to reduce the necessary memory capacity and maintain the calculation speed at a fixed speed.

In the SWF, this technique is called "marginalizing out". The marginalizing out is a process in which a posture(s) of a robot in the past and feature points that are seen from that posture are deleted by marginalization. By this process, the number M of postures of the robot that are handled in calculation is maintained at a fixed number, and thereby making it possible to maintain the calculation time in each step at a fixed length.

As described above, by using the SWF in which observation data in the past several steps can be used, it is possible to construct a map that uses PIRFs as feature points. Note that in this exemplary embodiment, the robot constructs a hybrid map in which each node expresses a local map by storing coordinates that are obtained by converting a position m^ of a feature point onto relative coordinates observed from the robot and its covariance as a local map in each step. By using the 3D-PIRF, which is a feature point in a three-dimensional space, in this manner, it is possible to perform robust SLAM navigation using position information of feature points even under a crowded environment in which there are a lot of people as described later.

Next, the map generation unit 16 according to this exemplary embodiment determines whether or not the current place was visited in the past. Then, when the current place was visited in the past, the map generation unit 16 corrects the previous position and posture $x_{Li0}$ of the moving body and the current position and posture $x_{Li}$ of the moving body based on $x_{Li0}$ and $x_{Li}$. This process is called "Loop-Closing" (FIG. 1, S102).

There is a problem in the SLAM that, in general, the longer the moving distance becomes, the more the errors are accumulated. Therefore, it is necessary to correct these accumulated errors. In order to collect the error on the map, it is necessary to determine whether or not the current place was visited in the past.

When the current place was visited once in the past, a local metrical map must have been already constructed. A PIRF in that position has been stored in the local metrical map. The robot apparatus calculates a PIRF at each timing (node) when successive images are captured, and determines whether or not the calculated PIRF matches any stored PIRF of each node. For example, when 90% or more of feature quantities match, it can be determined that the position was visited in the past. Note that the criterion is not limited to 90%. That is, the criterion may be set to a value larger than or smaller than 90%.

Then, when it is determined that the current place was visited in the past, $x_{Li0}$ and $x_{Li}$ are corrected by minimizing the below-shown Expression (10).

[Expression 13]

$$\sum_{i=1}^{N_L}\|x_{Li} - x_{Li0}\|^2_{P_L} + \sum_{t=1}^{T}\|x_{t-1} \oplus v_t - x_t\|^2_{Q_y} \quad (10)$$

where: $P_L$ and $Q_y$ are covariance that is used when Mahalanobis distance is calculated; $x_{Li}$ is place that is detected as ith place visited in past; $x_{Li0}$ is place that is recognized as same place as $x_{Li}$; $N_L$ is number of times of detection that it is place visited in past; T is total number of steps until now; and $v_t$ is relative coordinates of $x_t$ as observed from $x_{t-1}$.

[Expression 14]

$$x_{t-1} \oplus v_t$$

The above-shown expression indicates an arrival point when the moving body moves by $v_t$ on the relative coordinates of the locus $x_{t-1}$ of the moving body. Locus $x=[x_0^T, \ldots, x_T^T]^T$ can be corrected by minimizing this Expression (10). Further, in a position where Loop-Closing is detected, map construction can be performed while taking account of a local map that was constructed when visiting there in the past by substituting, as a prior distribution of the map, the position of a feature point(s) on the local map in the past for the average of m in Expression (8) and substituting the covariance for Π. By combining a local map in the past with the current observation data in this manner, it is possible to improve the accuracy of the local map.

Figure 6:
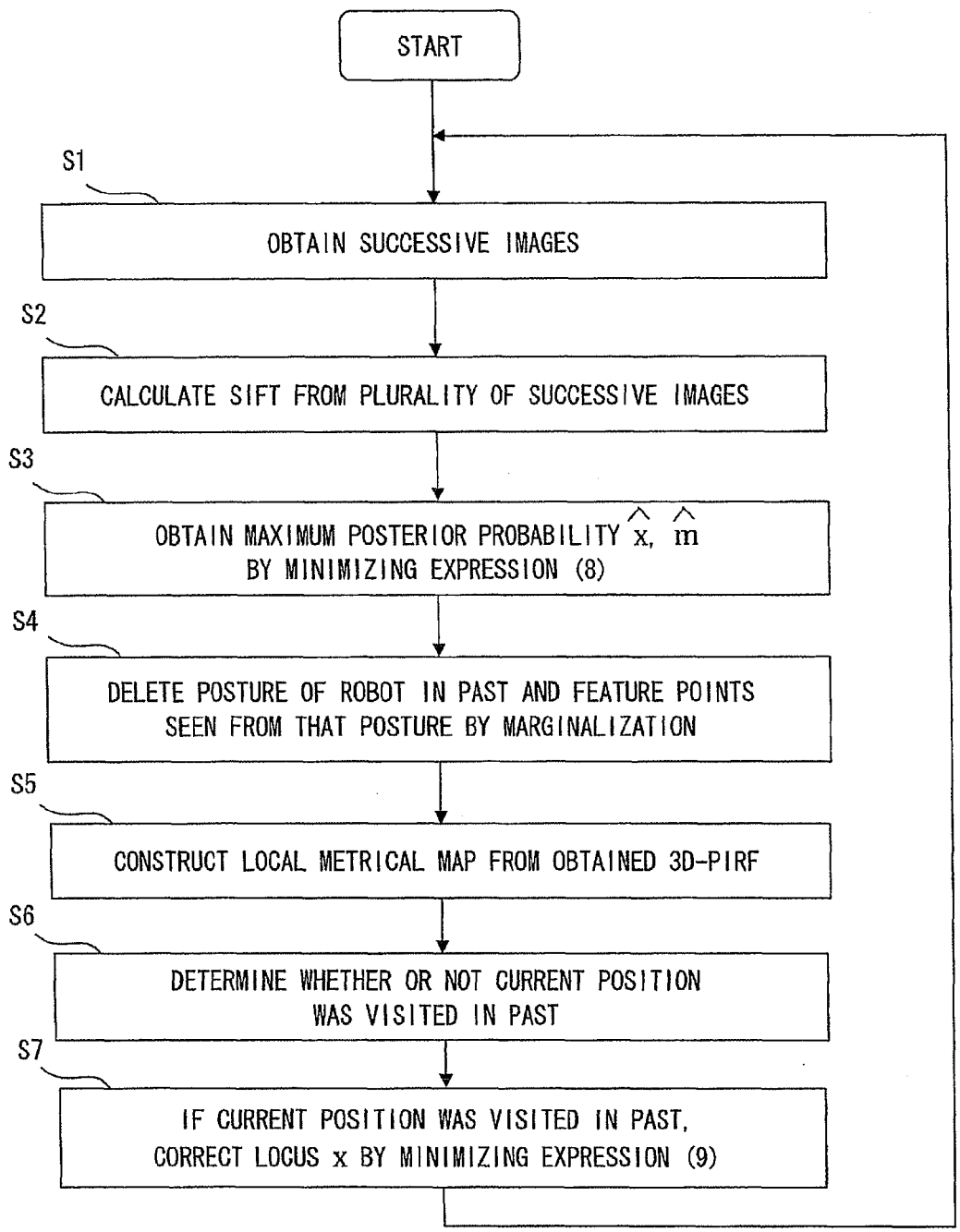
FIG. 6 is a flowchart showing a map generation method according to a first exemplary embodiment of the present invention.

Next, a map generation method according to this exemplary embodiment is explained. FIG. 6 is a flowchart showing a map generation method according to this exemplary embodiment. For example, a map can be successively constructed, by a moving body capable of obtaining successive images, by obtaining successive images while the moving body is moving. An example in which a robot constructs a map while obtaining successive images is explained hereinafter. This robot is equipped with the map generation apparatus shown in FIG. 2. Note that a configuration example of the robot is described later.

As shown in FIG. 6, firstly, successive images are obtained (step S1). Next, the local feature quantity extraction unit 12 calculates SIFTs of a plurality of successive images (step S2). The feature quantity matching unit 13 obtains matching of SIFTs between every successive images, and the invariant feature quantity calculation unit 14 calculates the average value of matched SIFTs as a PIRF.

In parallel with this process, the position information acquisition unit included in the distance information acquisition unit 15 or the map generation unit 16 minimizes the above-shown Expression (8) and thereby calculates maximum posterior probabilities $\hat{x}$ and $\hat{m}$ and their corresponding covariance (step S4).

Note that when the maximum posterior probability is calculated, three successive images that are taken at points of robot positions $x_0$, $x_1$ and $x_2$, for example, are used. In this case, when the next maximum posterior probability and the PIRF are calculated, three successive images that are taken at points of robot positions $x_1$, $x_2$ and $x_3$ are used and the successive images at the point $x_0$ are not used. Further, the PIRF that is not recognized any longer because the successive images at this point $x_0$ are not included is also deleted. In other words, the posture of the robot in the past and the feature points that are seen from that posture are deleted by marginalization (step S4). In this way, the number M of postures of the robot that are handled in the calculation is maintained at a fixed number, and the calculation time in each step is thereby maintained at a fixed length.

The map generation unit 16 constructs a relative position relation between the state of the robot and each feature point (local map) by using the maximum posterior probabilities $\hat{x}$ and $\hat{m}$ and their corresponding covariance obtained in the step S3 (step S5).

Note that the robot continuously determines whether or not the current place was visited in the past at all times (step S6). The robot has information of a PIRF at each point when successive images are obtained. Therefore, the robot calculates a PIRF while moving, and determines whether or not the calculated PIRF matches any PIRF possessed by the robot. For example, the robot determines a place for which 90% or more of the PIRF match as a place that was visited in the past.

When it is determined that the current place was visited in the past, the robot corrects the locus x by minimizing the above-shown Expression (9) (step S7). As the moving distance becomes longer, more errors are accumulated. However, the accumulated errors can be reset by implementing this step S7 (Loop-closing). Then, by repeating the above-described steps S1 to S7, it is possible to generate a desired map. Note that in order to perform the step S7, the robot needs to move along the same route twice when a map is created. In this way, it is possible to generate a map having higher accuracy. However, when a map having high accuracy can be obtained by moving along the route only once, the process in the step S7 can be omitted.

Second Exemplary Embodiment of the Present Invention

Next, a second exemplary embodiment is explained. In this exemplary embodiment, as a method for performing processing by removing a moving object(s), robust SLAM-navigation is performed by extracting stable three-dimensional feature points from images even under a crowded environment and using these feature points. As an example of this method, in this exemplary embodiment, a method in which a robot performs navigation by using a local metrical map created according to the first exemplary embodiment is explained.

Figure 7:
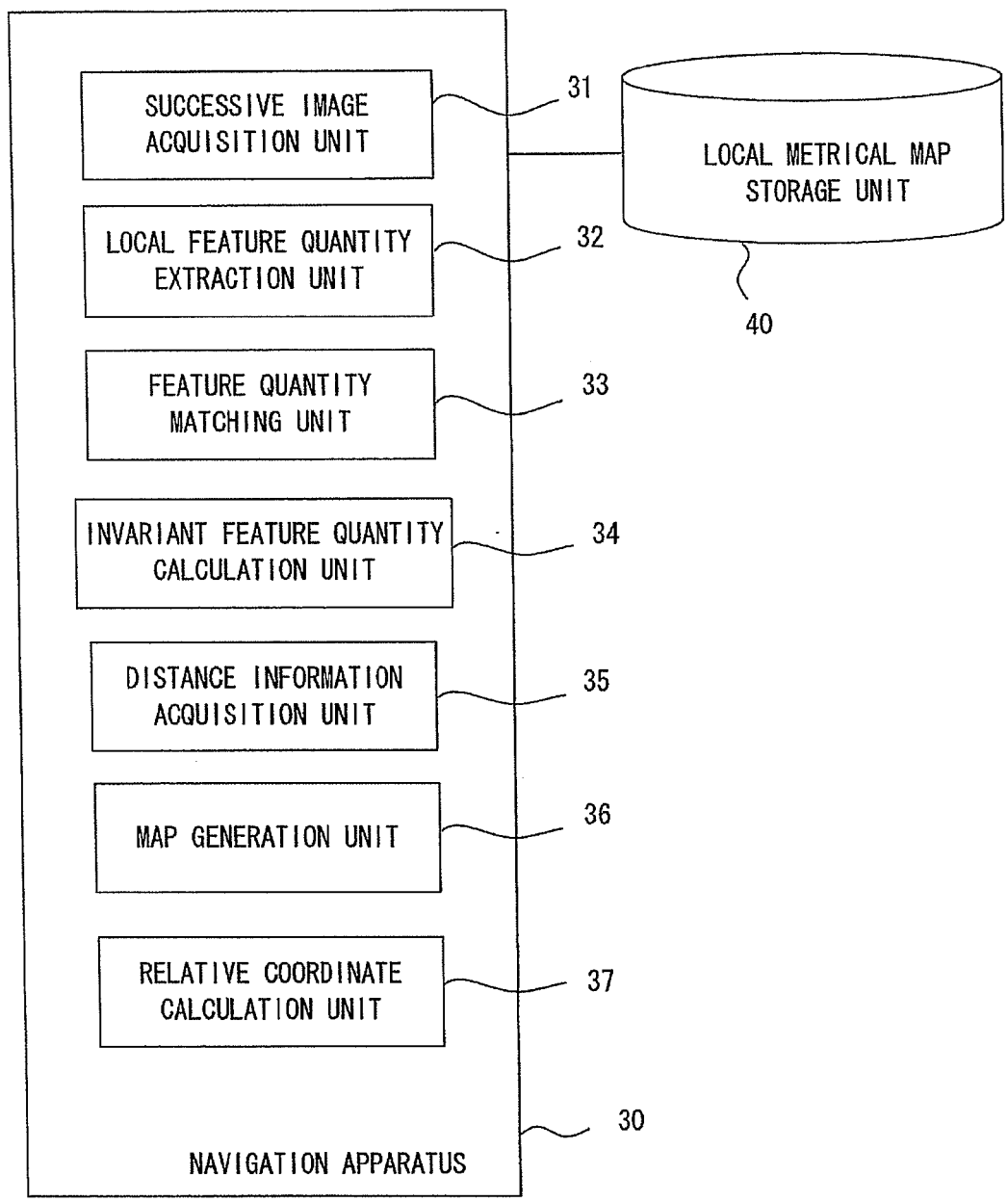
FIG. 7 is a block diagram showing a navigation apparatus according to a second exemplary embodiment of the present invention.

FIG. 7 is a block diagram showing a navigation apparatus according to this exemplary embodiment. As shown in FIG. 7, the navigation apparatus includes a successive image acquisition unit 31, a local feature quantity extraction unit 32, a feature quantity matching unit 33, an invariant feature quantity calculation unit 34, a position information acquisition unit 35, a map generation unit 36, and a relative coordinate calculation unit 37. Further, the navigation apparatus is connected to a local metrical map storage unit 40 and thereby configured to be able to refer to a local metrical map. Note that the above-described configuration except for the relative coordinate calculation unit 37 is similar to that of the first exemplary embodiment, and its operation is also similar.

Similarly to the first exemplary embodiment, this navigation apparatus 30 is mounted on a robot. When a start point and an end point are provided to the robot, the robot refers to a local metrical map of the local metrical map storage unit 40 and performs route planning. Then, the robot moves from the start point to the end point in accordance with the route plan. To do so, the robot implements the processes in the above-described step S1 to S6 while moving, and generates a hybrid map 17 even in the navigation phase.

Note that it is also possible to move to the end point while repeating the processes including the step S7 and thereby correcting the locus. Note that the navigation apparatus 30 according to this exemplary embodiment includes the relative coordinate calculation unit 37. When the step S6 is implemented and it is determined that the current position was visited in the past, the relative coordinate calculation unit 37 calculates relative coordinates indicating how much the current position is deviated from the position in the past.

Figure 8:
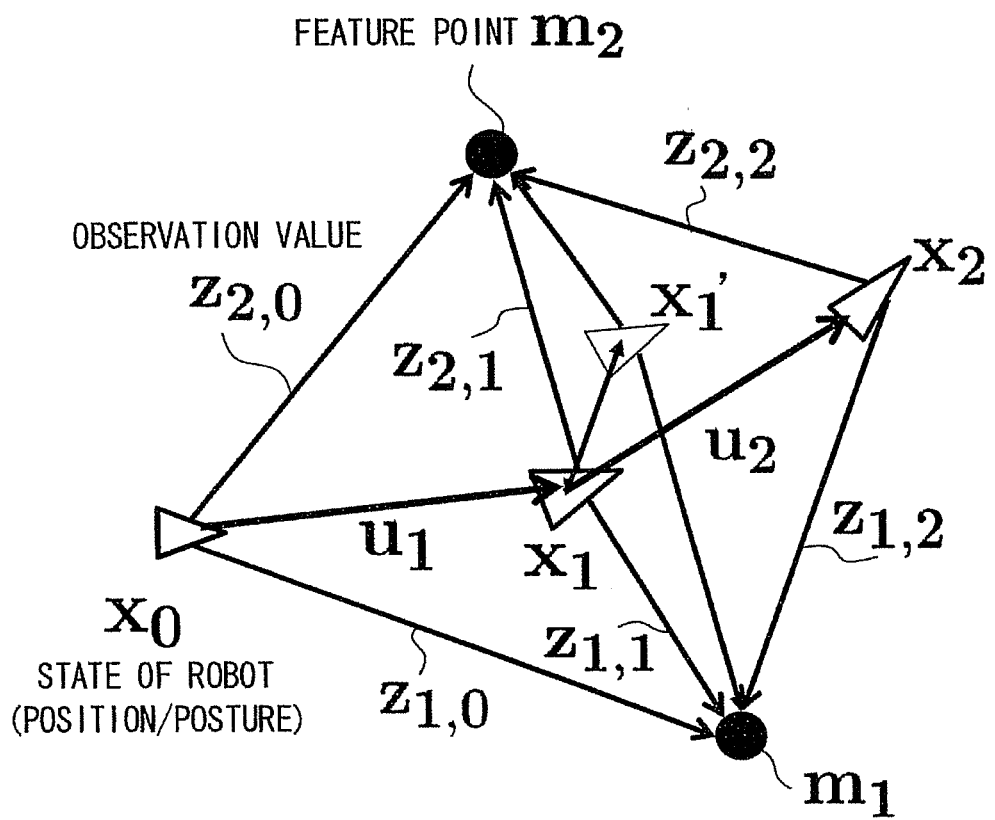
FIG. 8 is a diagram for explaining a calculation method of a relative coordinates in a second exemplary embodiment of the present invention.

FIG. 8 is a diagram for explaining a calculation method of relative coordinates. In FIG. 8, positions through which the robot has passed when the local metrical map is generated are represented by $x_0$, $x_1$ and $x_2$. The current position is represented by $x_1'$. In this case, the positions of feature points $m_1$ and $m_2$ observed from the current position $x_1'$ are obtained by minimizing Expression (8). The local metrical map includes information of the positions of feature points $m_1$ and $m_2$ observed from the position $x_1$. Therefore, it is possible to calculate how much the current position $x_1'$ is deviated from the position $x_1$ in the past.

For example, the current position is defined as $x_t'=x_t+\alpha$, the relative position $\alpha$ can be calculated by using any algorithm capable of calculating relative coordinates from observation data. Examples of this arbitrary algorithm include a five-point algorithm and an eight-point algorithm (Richard I. Hartley: "In Defense of the Eight-Point Algorithm," IEEE Transactions on Pattern Analysis and Machine Intelligence, Vol. 19, No. 6, pp. 580-583 (1997)).

For example, the eight-point algorithm is a technique for obtaining a relative posture by comparing observation data of $x_t$ and $x_t'$ (positions of feature points) in FIG. 8. When the relative coordinates a is calculated by the eight-point algorithm, the locus can be corrected by minimizing the below-shown Expression (11).

[Expression 15]

$$\sum_{i=1}^{N_L} \|x_{Li} - (x_{Learnedi0} + \alpha_i)\|^2_{P_L} + \sum_{i=1}^{T} \|x_{t-1} \oplus v_t - x_t\|^2_{Q_y} \quad (11)$$

where: $\alpha_i$ indicates relative posture between $x_{Li}$ and $x_{Learnedi0}$ calculated by the eight-point algorithm. Further, $P_L$ and $Q_y$ are covariance that is used when Mahalanobis distance is calculated; $x_{Li}$ is place that is detected as ith place registered on map; and $x_{Learnedi0}$ is place that is recognized as same place as $x_{Li}$ and is fixed value. $N_L$ is number of times of detection that it is place registered on map; T is total number of steps until now; and $v_t$ is relative coordinates of $x_t$ as observed from $x_{t-1}$.

[Expression 16]

$$x_{t-1} \oplus v_t$$

The above-shown expression indicates an arrival point when the moving body moves by $v_t$ on the relative coordinates of the locus $x_{t-1}$ of the moving body.

As described above, in this exemplary embodiment, instead of correcting the locus by simply minimizing Expression (11), relative coordinates between the current position $x_1'$ and the past position $x_1$ registered in a local metrical map are calculated and then Expression (11) is minimized by using the relative coordinates. As a result, the navigation can be performed with higher accuracy.

Figure 9:
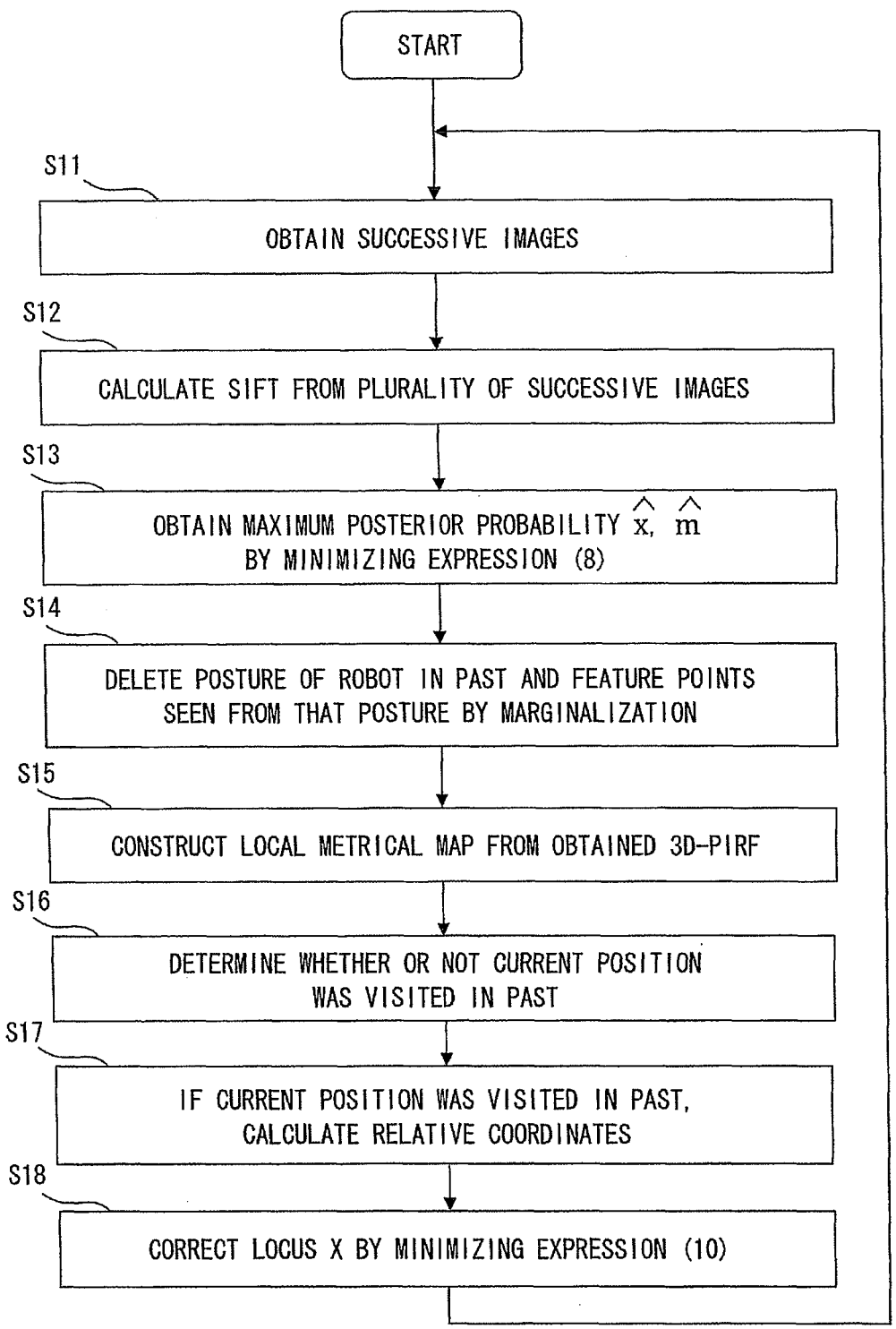
FIG. 9 is a flowchart showing a navigation method for a robot according to second exemplary embodiment of the present invention.

FIG. 9 is a flowchart showing a navigation method for a robot according to this exemplary embodiment. In FIG. 9, steps S11 to S16 are similar to the steps S1 to S6 in the first exemplary embodiment shown in FIG. 6. That is, similarly to the first exemplary embodiment, a 3D-PIRF is calculated and it is determined whether or not the current position was visited in the past (step S16). Then, when it is determined that the current position was visited in the past, relative coordinates between the current position and the past position are calculated (step S17). Then, the relative coordinates are substituted into Expression (11), and the locus x is corrected by minimizing this expression (step S18). After that, the processes are repeated from the step S11.

In the navigation phase, the robot autonomously moves according to the route taught in the learning phase. The moving robot moves while constructing a hybrid map as in the case of the learning phase. However, in the navigation phase, since the moving robot moves according to the taught route, the moving robot performs behavior planning by comparing the locus and the local map of the hybrid map learned in the learning phase with those of the current hybrid map and thereby correcting the position of the robot toward the learned locus so that the robot follows the learned locus.

Figure 10:
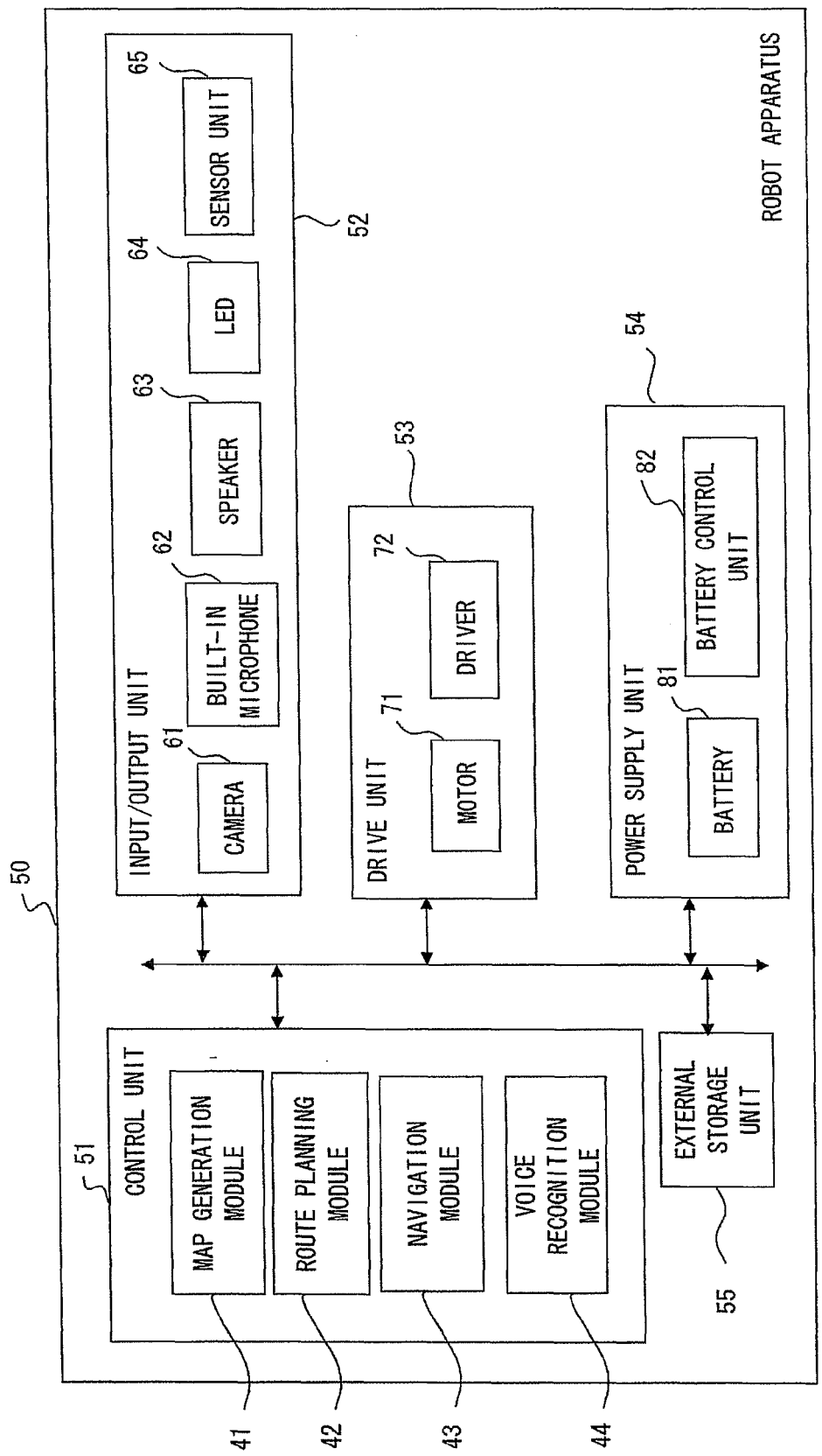
FIG. 10 is a block diagram showing a robot according to a second exemplary embodiment of the present invention.

An example of a robot that performs such navigation is explained. FIG. 10 is a block diagram showing a robot according to this exemplary embodiment. A robot 50 includes a control unit 51, an input/output unit 52, a drive unit 53, a power supply unit 54, an external storage unit 55, and so on.

The input/output unit 52 includes a camera 61 including a CCD (Charge Coupled Device) or the like for taking images of surrounding environments, at least one built-in microphone 62 for collecting sound from surrounding environments, a speaker 63 for producing sound and thereby interacting with a user, an LED(s) 64 for expressing responses, emotions, or the like to a user, a sensor unit 85 including a touch sensor or the like, and so on.

Further, the drive unit 53 includes a motor 71, a driver 72 that drives the motor 71, and so on, and operates a leg unit and/or an arm unit according to instructions from a user. The power supply unit 54 includes a battery 81 and a battery control unit 82 that controls the charging/discharging of the battery 81, and supplies electric power to each unit.

The external storage unit 55 includes a removable HDD, an optical disc, a magneto-optic disc, or the like, stores various programs, control parameters, and the like, and supplies those programs and data as necessary to a memory (not shown) or the like located in the control unit 51.

The control unit 51 includes a CPU (Central Processing Unit), a ROM (Read Only Memory), a RAM (Random Access Memory), an interface for radio communication, and the like, and controls various operations of the robot 50. Further, this control unit 51 includes a map generation module 41 that generates a hybrid map, for example, by analyzing video images obtained by the camera 61 according to a control program stored in the ROM, a route planning module 42 that performs route planning based on the generated hybrid map, a navigation module 43 that performs navigation according to the route plan when a start point and an end point are provided, a voice recognition module 44 that performs voice recognition, and so on. In particular, in this exemplary embodiment, a hybrid map that is obtained by extracting stable feature points even under a complicated environment is generated by the map generation module 41. Further, the robot 50 performs route planning based on this hybrid map, determines its behavior, and controls the drive unit 53. Therefore, the robot 50 can perform navigation with higher accuracy.

EXAMPLES

Figure 11:
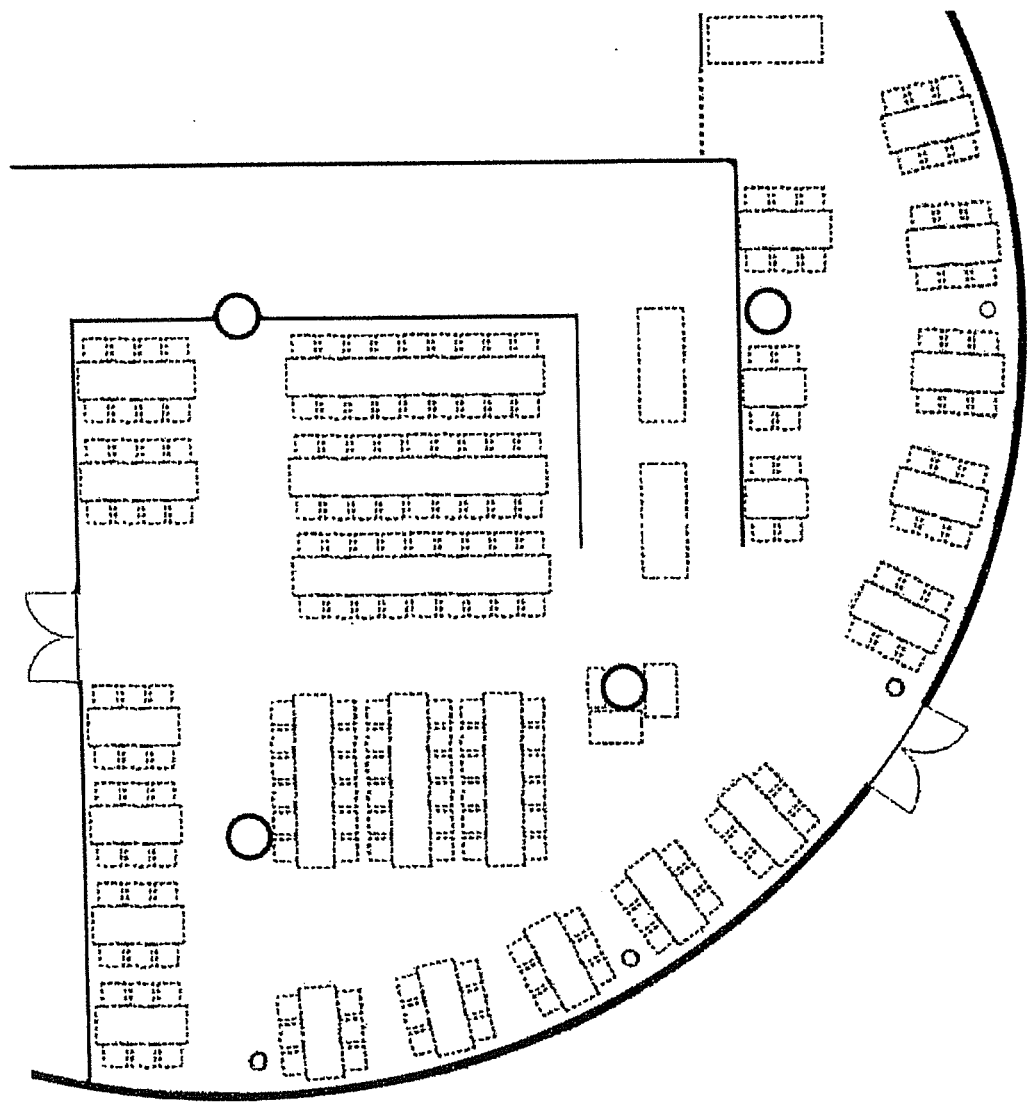
FIG. 11 shows an indoor environment in an example of the present invention.

Map generation was performed in an indoor environment having an area of about 20 m×20 m. FIG. 11 shows the environment. This environment is a crowded dining lounge in which a lot of people go in and out at all times. In the case of the environment in which people go in and out at all times like this, when a conventional technique is used, feature points extracted from moving people have adverse effects and making it impossible to perform robust SLAM-navigation.

Figure 12:
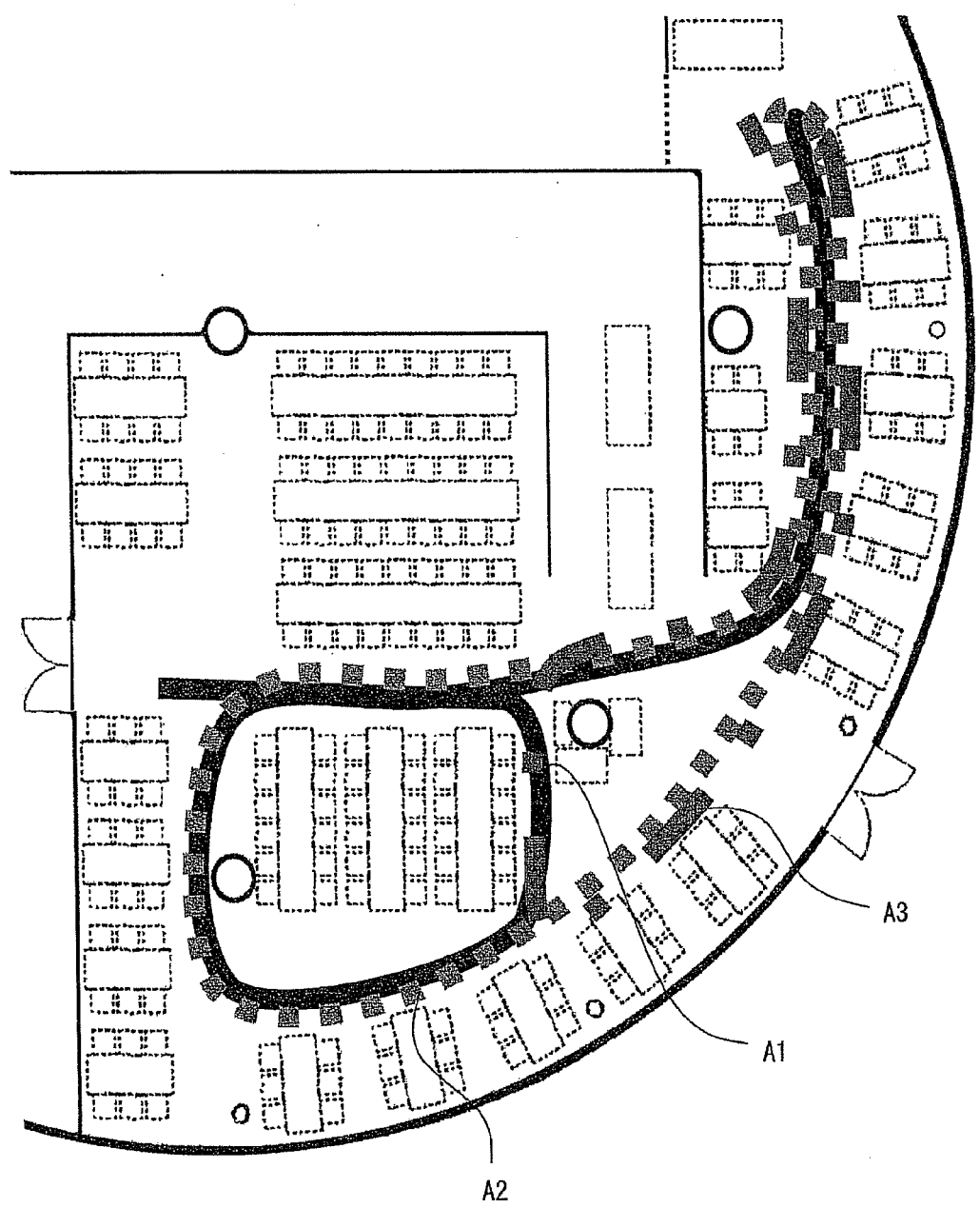
FIG. 12 shows a true-value map of an environment and a route along which a robot was moved in a learning phase in an example of the present invention.

In contrast to this, this exemplary embodiment has such a characteristic that robust SLAM-navigation can be performed even under a crowded environment. Firstly, in a learning phase, a robot equipped with an omnidirectional camera and an encoder sensor moves under the operation of a human while performing self-localization and map construction by using the above-described method. FIG. 12 shows a true-value map of the environment and a route along which the robot was moved in the learning phase. Firstly, the robot was made to go around along a small loop A1 indicated by a lower-left solid line twice. Next, the robot was made to go to an upper-right section, and from there, made to go around along a large loop A2 indicated by a dotted line twice. Finally, the robot was made to go around along a small loop A3 indicated by an alternate long and short dash line twice.

Figure 13:
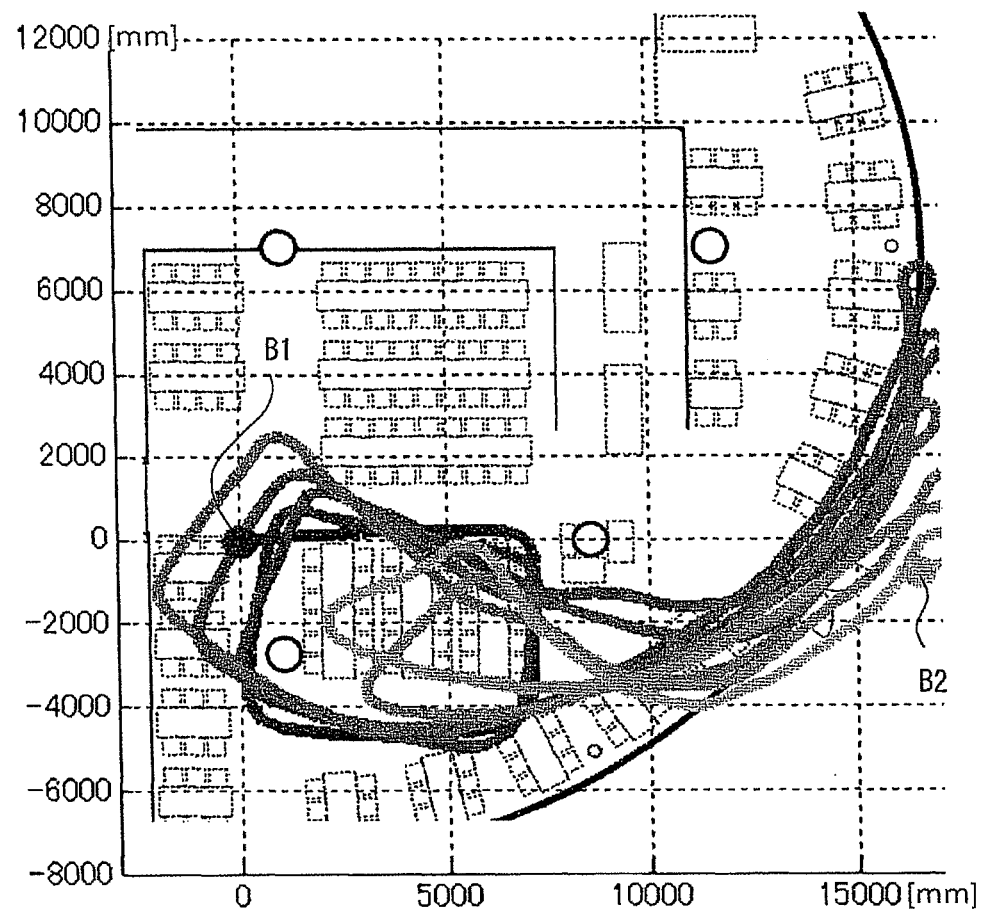
FIG. 13 shows a locus of a robot that is calculated based on an odometry alone without using information from a camera in an example of the present invention.

FIG. 13 shows the locus of the robot that was calculated based on odometry alone without using any information from the camera for the above-described route. In FIG. 13, B1 indicates a start point and B2 indicates a goal point. The route is drawn in such a manner that its color gradually becomes paler as the distance from the start point increases. From this figure, it is shown that when measurement is carried out based on the odometry alone, errors in the self-localization are accumulated more and more as the moving distance increases, and thus indicating that the locus is not correctly learned.

Figure 14:
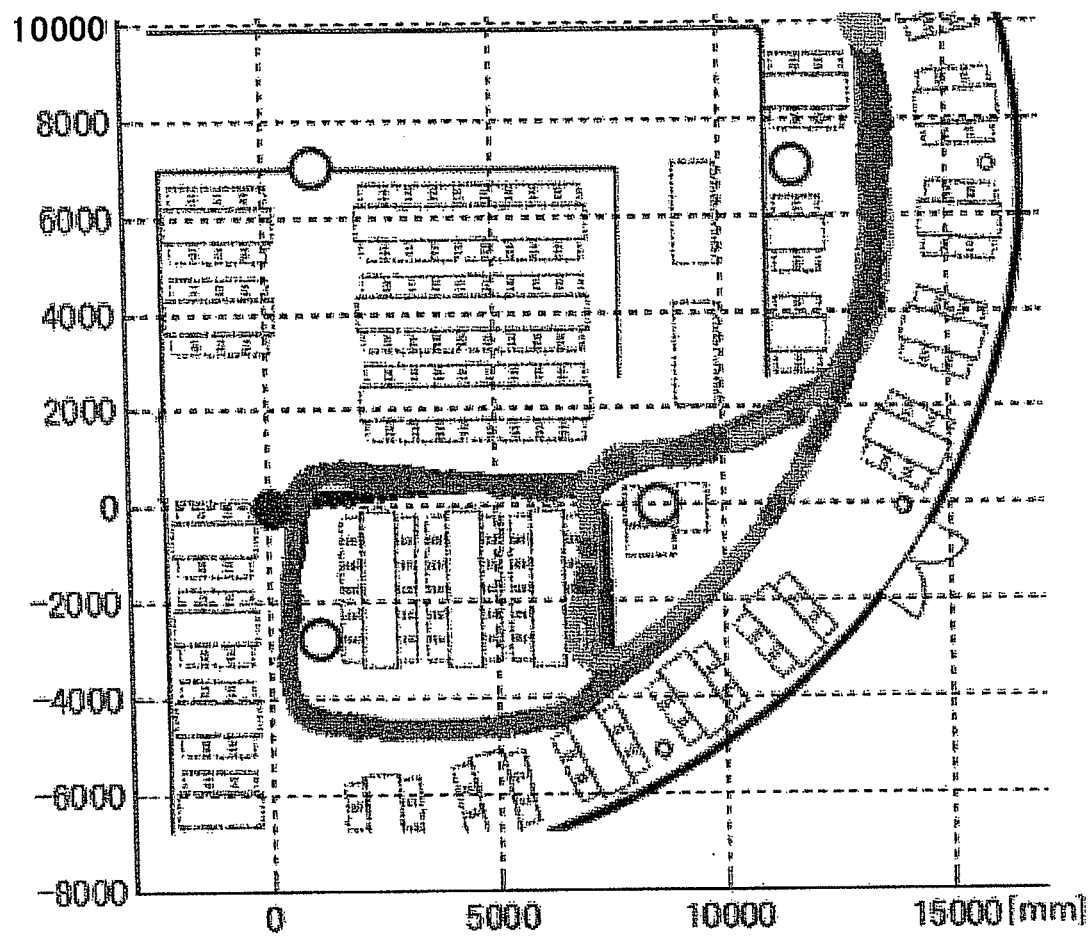
FIG. 14 shows a locus that a robot has learned by a method according to this exemplary embodiment.

Meanwhile, FIG. 14 shows a locus that the robot had learned by a method according to this exemplary embodiment. In FIG. 14, small circles indicate positions that are recognized as positions that were visited in the past (Loop-Closing detection). From this figure, it is shown that errors are not accumulated even when the moving distance increases, and thus indicating that the locus is correctly learned.

Figure 15:
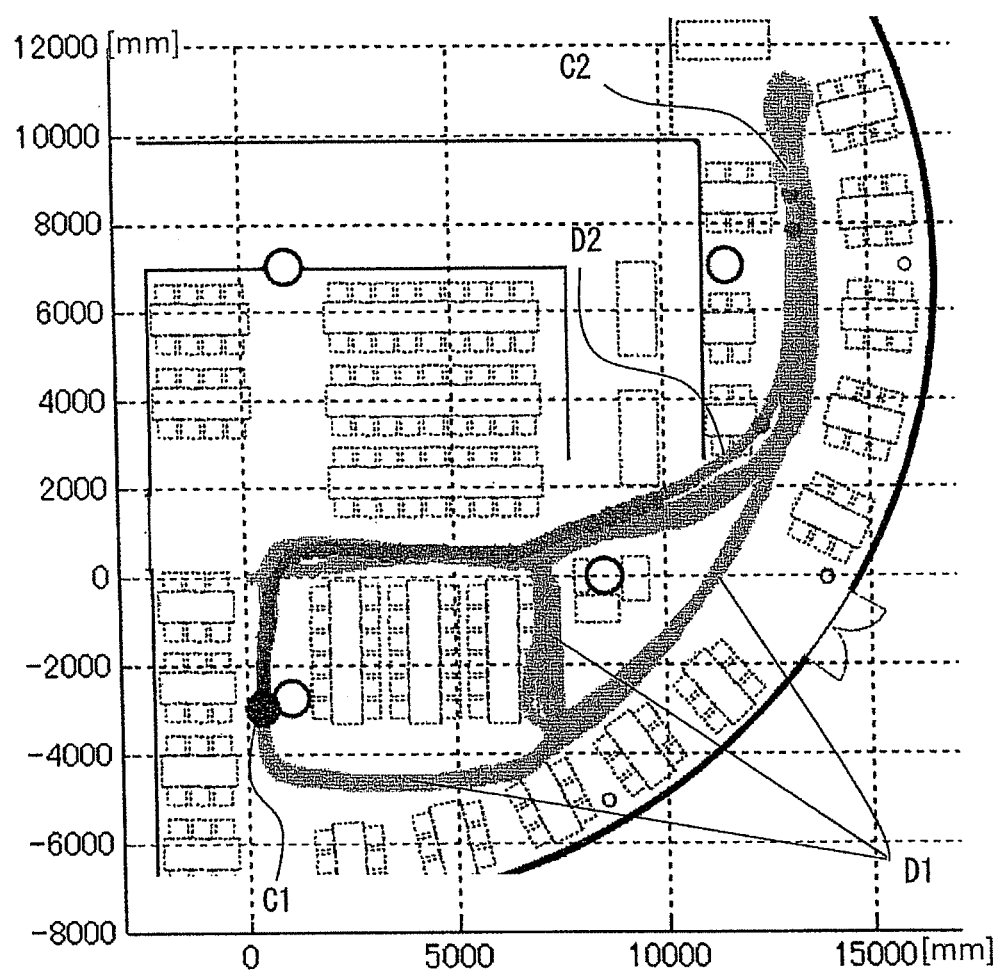
FIG. 15 shows a locus along which a robot has autonomously moved.

Next, in a navigation phase, the robot autonomously moves so as to follow the locus learned in the learning phase. FIG. 15 shows a locus along which the robot had autonomously moved. In this case, route planning was performed so that the robot moves from a lower-left point C1 to an upper-right point C2. In FIG. 15, the locus that was learned in the learning phase is indicated by D1 and the locus along which the robot had moved is indicated by D2. Further, positions in which Loop-Closing detection was performed for the locus learned in the learning phase are indicated by small circles. From this figure, it is shown that the robot had autonomously moved so as to follow the route from the lower-left point C1 to the upper-right point C2 learned in the leaning phase and thereby arrived at the goal point.

Note that the present invention is not limited to the above-described exemplary embodiments, and needless to say, various modifications can be made without departing from the spirit and scope of the present invention.

For example, although the present invention is described as a hardware configuration in the above-described exemplary embodiments, the present invention is not limited to the hardware configurations. It is also possible to implement arbitrary processes by causing a CPU (Central Processing Unit) to execute a computer program. In such cases, the computer program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

This application is based upon and claims the benefit of priority from Japanese patent application No. 2010-209657, filed on Sep. 17, 2010, the disclosure of which is incorporated herein in its entirety by reference.

INDUSTRIAL APPLICABILITY

REFERENCE SIGNS LIST

1 MAP GENERATION APPARATUS
11 SUCCESSIVE IMAGE ACQUISITION UNIT
12 LOCAL FEATURE QUANTITY EXTRACTION UNIT
13 FEATURE QUANTITY MATCHING UNIT
14 INVARIANT FEATURE QUANTITY CALCULATION UNIT
15 DISTANCE INFORMATION ACQUISITION UNIT
16 MAP GENERATION UNIT
30 NAVIGATION APPARATUS
31 SUCCESSIVE IMAGE ACQUISITION UNIT
32 LOCAL FEATURE QUANTITY EXTRACTION UNIT
33 FEATURE QUANTITY MATCHING UNIT
34 INVARIANT FEATURE QUANTITY CALCULATION UNIT
35 DISTANCE INFORMATION ACQUISITION UNIT
36 MAP GENERATION UNIT
37 RELATIVE COORDINATE CALCULATION UNIT
40 LOCAL METRICAL MAP STORAGE UNIT
541 MAP GENERATION MODULE
542 ROUTE PLANNING MODULE
543 NAVIGATION MODULE
544 VOICE RECOGNITION MODULE
50 ROBOT
51 CONTROL UNIT
552 INPUT/OUTPUT UNIT
553 DRIVE UNIT
554 POWER SUPPLY UNIT
555 EXTERNAL STORAGE UNIT
561 CAMERA
562 BUILT-IN MICROPHONE
563 SPEAKER
565 SENSOR UNIT
571 MOTOR
572 DRIVER
581 BATTERY
582 BATTERY CONTROL UNIT

The invention claimed is:

1. A map generation method comprising:
obtaining successive images that are successively taken while a moving body is moving;
extracting a local feature quantity at each feature point from the successive images obtained in the successive image acquisition step;
performing matching among the local feature quantities in the successive input images, the local feature quantity being extracted in the local feature quantity extraction step;
calculating an average of matched local feature quantities among a predetermined number of successive images in the feature quantity matching step as an invariant feature quantity;
using PIRF to extract the average matched feature points between successive image by removing feature points that have a large physical change;
calculating distance information corresponding to each invariant feature quantity based on a position of the moving body at each point in time when the successive images are obtained; and
generating a local metrical map as a hybrid map including the invariant feature quantity and the distance information.

2. The map generation method according to claim 1, further comprising obtaining a position and a posture of the moving body, and a position of a feature point corresponding to the invariant feature quantity from information and an observation values, the information indicating about a movement of the moving body at each point in time when a series of a plurality of successive images are obtained, the observation value indicating a measurement direction of a feature point having the invariant feature quantity, and the measurement direction being seen from the moving body, wherein
in the map generation step, the hybrid map including a position and a posture of the moving body, and a position and an invariant feature quantity of a feature point are generated.

3. The map generation method according to claim 2, wherein when acquiring position information a stochastically most likely position and posture of the moving body and a position of the feature point are calculated from a group of information and a group of the observation values, the group of the information indicating about the moving body at each point in time when the plurality of successive images from which the invariant feature quantity are obtained.

4. The map generation method according to claim 2, wherein when acquiring position information the hybrid map including a position and a posture of the moving body at each point in time and a position of the feature point are generated, the position and the posture of the moving body and the position of the feature point being obtained among the plurality of successive images by minimizing a below-shown expression with an observation value $z_{ij}$ and an input $u_t$, the observation value $z_{ij}$ indicating in which direction the invariant feature quantity is seen from the moving body at each point in time, and the input $u_t$ indicating distance information that is used when the moving body moves from $x_t$ to $x_{t-1}$, when the position and the posture of the moving body being represented by $x_t$;

$$\hat{x}, \hat{m} \stackrel{\Delta}{=} \underset{\{x,m\}}{\operatorname{argmax}} \left\{ \|\widetilde{x}_0 - x_0\|_{P_0}^2 + \|\widetilde{m} - m\|_{\Pi}^2 + \sum_{t=1}^{M} \|f(x_{t-1}, u_t) - x_t\|_{Q_t}^2 + \sum_{t=1}^{M} \sum_{i} \|h(x_t, m_i) - z_i\|_{R_i}^2 \right\}$$ [Expression 17]

where:
$\hat{x}$: position and posture of moving body;
$\hat{m}$: position of invariant feature quantity;
$Q_t$: covariance corresponding to behavior model of $x_t$ when input $u_t$ is added in posture $x_{t-1}$;
$R_t$: covariance corresponding to measurement model of measurement value $z_t$ when feature point $m_i$ is observed from position $x_t$ of mobbing body;
f: behavior model;
h: measurement model;
$\widetilde{x}_0$: average of $x_0$; and
$\hat{m}$: average of m.

5. The map generation method according to claim 2, wherein
the invariant feature quantity and a position and a posture of the moving body are obtained from a plurality of successive images, and
the generation of the map includes deleting past successive images so that the number of successive images that are used to calculate the position and the posture of the moving body and the invariant feature quantity is equal at each point in time, and deleting the invariant feature quantity that disappears as a result of deleting the successive images.

6. The map generation method according to claim 2, further comprising:
determining whether or not a current place was visited in past; and
correcting a previous position and posture $x_{Li0}$ of the moving body and a current position and posture $x_{Li}$ of the moving body based on $x_{Li0}$ and $x_{Li}$ when the current place was visited in past.

7. The map generation method according to claim 6, wherein the values $x_{Li0}$ and $x_{Li}$ are corrected by minimizing a below-shown expression:

$$\sum_{i=1}^{N_L} \|x_{Li} - x_{Li0}\|_{P_L}^2 + \sum_{t=1}^{T} \|x_{t-1} \oplus v_t - x_t\|_{Q_y}^2$$ [Expression 18]

where:
$P_L$ and $Q_y$ are covariance that is used when Mahalanobis distance is calculated;
$x_{Li}$ is place that is detected as ith place visited in past;
$x_{Li0}$ is place that is recognized as same place as XL;
$N_L$ is number of times of visiting in past;
T is total number of steps until now;
$v_t$ is relative coordinate of $x_t$ as observed from $x_{t-1}$; and
$x_{t-1} \oplus v_t$ indicates arrival point of locus $x_{t-1}$ of moving body, when moving body moves by $v_t$ on relative coordinate.

8. A map generation apparatus comprising:
successive image acquisition means for obtaining successive images that are successively taken while a moving body is moving;
local feature quantity extraction means for extracting a local feature quantity at each feature point from the successive images obtained by the successive image acquisition means;
feature quantity matching means for performing matching among the local feature quantities in the successive input images extracted by the local feature quantity extraction means;
invariant feature quantity calculation means for calculating an average of matched local feature quantities among a predetermined number of successive images by the feature quantity matching means as an invariant feature quantity;
extraction means for using PIRF to extract the average matched feature points between successive images by removing feature points that have a large physical change;
distance information acquisition means for calculating distance information corresponding to each invariant feature quantity based on a position of the moving body at each point in time when the successive images are obtained; and
map generation means for generating a local metrical map as a hybrid map including the invariant feature quantity and the distance information.

9. The map generation apparatus according to claim 8, further comprising a position information acquisition means for obtaining a position and a posture of the moving body, and a position of a feature point corresponding to the invariant feature quantity from information and an observation value, the information indicating about a movement of the moving body at each point in time when a series of a plurality of successive images are obtained, the observation value indicating a measurement direction of a feature point having the invariant feature quantity, and the measurement direction being seen from the moving body, wherein
the map generation means generates the hybrid map including a position and a posture of the moving body, and a position and an invariant feature quantity of a feature point are generated.

10. The map generation apparatus according to claim 9, wherein the position information acquisition means calculates a stochastically most likely position and posture of the moving body, and a position of the feature point calculated from a group of information and a group of the observation values, the group of the information indicating about the moving body at each point in time when the plurality of successive images from which the invariant feature quantity are obtained.

11. A moving method for a moving body that performs route planning according to a local metrical map created in advance and thereby moves, comprising:
    obtaining successive images while a moving body is moving;
    extracting a local feature quantity at each feature point from the successive images obtained in the successive image acquisition step;
    performing matching among the local feature quantities in the successive input images, the local feature quantities being extracted in the local feature quantity extraction step;
    calculating an average of matched local feature quantities among a predetermined number of successive images in the feature quantity matching step as an invariant feature quantity;
    using PIRF to extract the average matched feature points between successive images by removing feature points that have a large physical change;
    calculating distance information corresponding to each invariant feature quantity based on a position of the moving body at each point in time when the successive images are obtained; and
    comparing the calculated invariant feature quantity and the distance information with an invariant feature quantity and distance information registered on the local metrical map, determining whether or not a current place is registered, and when the current place is registered, correcting the current place based on information of the local metrical map, wherein
    the local metrical map is a hybrid map including distance information corresponding to each invariant feature quantity calculated based on position information at each point in time when the moving body has obtained the successive images and including the invariant feature quantity.

12. The moving method for a moving body according to claim 11, wherein when correcting the current place based on information of the local metrical map, when a current place is registered on the local metrical map, a registered position and posture $x_{Learnedi0}$ of the moving body and a current position and posture $x_{Li}$ of the moving body are corrected based on $x_{Learnedi0}$ and $x_{Li}$.

13. The moving method for a moving body according to claim 12, wherein when correcting the current place based on information of the local metrical map, the values $x_{Learnedi0}$ and $x_{Li}$ are corrected by minimizing a below-shown expression:

$$\sum_{i=1}^{N_L} \|x_{Li} - x_{Learnedi0}\|_{P_L}^2 + \sum_{i=1}^{T} \|x_{t-1} \oplus v_t - x_t\|_{Q_y}^2 \quad \text{[Expression 19]}$$

where:
    $P_L$ and $Q_y$ are covariance that is used when Mahalanobis distance is calculated;
    $x_{Li}$ is place that is detected as ith place registered on map;
    $x_{Learnedi0}$ is place that is recognized as same place as $x_{Li}$;
    $N_L$ is number of times of detection that it is place registered on map;
    T is total number of steps until now;
    $v_t$ is relative coordinate of $x_t$ as observed from $x_{t-1}$; and
    $x_{t-1} \oplus v_t$ indicates arrival point when it moves by $v_t$ on a relative coordinate of a locus $x_{t-1}$ of the moving body.

14. The moving method for a moving body according to claim 13, further comprising calculating a relative coordinate indicating how much a current place is different from a place registered on a map, wherein
    when correcting the current place based on information of the local metrical map, the locus is corrected by using the relative coordinate as the value $x_{Li}$.

15. A robot apparatus that performs route planning according to a local metrical map created in advance and thereby moves, comprising:
    successive image acquisition means for obtaining successive images while a moving body is moving;
    local feature quantity extraction means for extracting a local feature quantity at each feature point from the successive images obtained by the successive image acquisition means;
    feature quantity matching means for performing matching among the local feature quantities in the successive input images extracted by the local feature quantity extraction means;
    invariant feature quantity calculation means for calculating an average of matched local feature quantities among a predetermined number of successive images, the matched local feature quantities being obtained by the feature quantity matching means as an invariant feature quantity;
    extraction means for using PIRF to extract the average matched feature points between successive images by removing feature points that have a large physical change;
    distance information acquisition means for calculating distance information corresponding to each invariant feature quantity based on a position of the moving body at each point in time when the successive images are obtained; and
    locus correction means for comparing the calculated invariant feature quantity and the distance information with an invariant feature quantity and distance information registered on the local metrical map, determining whether or not a current place is registered, and when the current place is registered, correcting the current place based on information of the local metrical map, wherein
    the local metrical map is a hybrid map including distance information corresponding to each invariant feature quantity calculated based on position information at each point in time when the moving body has obtained the successive images and including the invariant feature quantity.

* * * * *